(12) United States Patent
Yamada et al.

(10) Patent No.: US 8,770,327 B2
(45) Date of Patent: Jul. 8, 2014

(54) ACCESSORY DRIVE MECHANISM FOR HYBRID VEHICLE

(75) Inventors: Yoshiaki Yamada, Minamisaitama-gun (JP); Takayuki Tsuchiya, Saitama (JP); Kunihiko Hikiri, Gyoda (JP)

(73) Assignee: UD Trucks Corporation, Saitama (JP)

( * ) Notice: Subject to any disclaimer, the term of this patent is extended or adjusted under 35 U.S.C. 154(b) by 0 days.

(21) Appl. No.: 13/517,047

(22) PCT Filed: Nov. 5, 2010

(86) PCT No.: PCT/JP2010/069660
§ 371 (c)(1),
(2), (4) Date: Jun. 18, 2012

(87) PCT Pub. No.: WO2011/074345
PCT Pub. Date: Jun. 23, 2011

(65) Prior Publication Data
US 2012/0266701 A1    Oct. 25, 2012

(30) Foreign Application Priority Data

Dec. 18, 2009 (JP) .................................. 2009-287699
Dec. 18, 2009 (JP) .................................. 2009-287718

(51) Int. Cl.
*B60K 6/42* (2007.10)
(52) U.S. Cl.
USPC ........................................................ 180/65.22
(58) Field of Classification Search
USPC .......................................... 180/65.21–65.29
See application file for complete search history.

(56) References Cited

U.S. PATENT DOCUMENTS

| | | | | |
|---|---|---|---|---|
| 5,669,842 A | * | 9/1997 | Schmidt | 475/5 |
| 6,857,985 B2 | * | 2/2005 | Williams | 477/5 |
| 7,104,920 B2 | * | 9/2006 | Beaty et al. | 477/5 |
| 8,010,263 B2 | * | 8/2011 | Morris | 701/51 |

(Continued)

FOREIGN PATENT DOCUMENTS

| | | |
|---|---|---|
| JP | 11-98601 A1 | 4/1999 |
| JP | 11-210486 A1 | 8/1999 |

(Continued)

OTHER PUBLICATIONS

International Search Report for PCT/JP2010/069660, Jan. 25, 2011.

*Primary Examiner* — Jeffrey J Restifo
*Assistant Examiner* — Erez Gurari
(74) *Attorney, Agent, or Firm* — Smith Patent Office

(57) ABSTRACT

An accessory drive mechanism for a hybrid vehicle, capable of operating accessories irrespective of the travel state of the vehicle, and also capable of smoothly switching between the power which is transmitted from the traveling motor side and the power which is transmitted from the accessory drive motor side. The accessory drive mechanism is provided with a drive power take-off mechanism (20) for taking out the power from a travel drive system (D). An accessory (11) is connected to the drive power take-off mechanism (20). A first one-way clutch (C1) which can transmit the power only to the accessory (11) side is disposed between the drive power take-off mechanism (20) and the accessory (11). An accessory driving motor (an auxiliary motor (12e)) is connected to the side of the accessory (11) which is on the opposite side from the drive power take-off mechanism (20). A second one-way clutch (C2) which can transmit the power only to the accessory (11) side is disposed between the accessory (11) and the accessory driving motor (12).

2 Claims, 12 Drawing Sheets

(56) References Cited

U.S. PATENT DOCUMENTS

| | | |
|---|---|---|
| 2002/0084118 A1 | 7/2002 | Esaki |
| 2003/0094317 A1 | 5/2003 | Takizawa et al. |
| 2003/0100395 A1* | 5/2003 | Hiraiwa .................. 475/5 |
| 2003/0192489 A1* | 10/2003 | Singh .................. 123/25 C |
| 2006/0052215 A1* | 3/2006 | Beaty et al. .................. 477/5 |
| 2008/0097661 A1* | 4/2008 | Moran .................. 701/22 |
| 2008/0177434 A1* | 7/2008 | Moran .................. 701/22 |
| 2009/0018716 A1* | 1/2009 | Ambrosio .................. 701/22 |
| 2009/0221399 A1* | 9/2009 | Eriksson et al. .................. 477/115 |
| 2010/0109340 A1* | 5/2010 | Storm et al. .................. 290/1 |
| 2010/0219007 A1* | 9/2010 | Dalum et al. .................. 180/65.22 |
| 2010/0280712 A1* | 11/2010 | Bowman .................. 701/36 |
| 2010/0292046 A1* | 11/2010 | Kaltenbach .................. 477/3 |
| 2011/0017533 A1* | 1/2011 | Bissontz .................. 180/65.25 |
| 2011/0024255 A1* | 2/2011 | Gomm et al. .................. 192/84.1 |
| 2011/0040432 A1* | 2/2011 | Kaltenbach et al. .................. 701/22 |
| 2011/0093147 A1* | 4/2011 | Kaltenbach et al. .................. 701/22 |
| 2011/0198140 A1* | 8/2011 | Wallner et al. .................. 180/65.28 |
| 2011/0219900 A1* | 9/2011 | Schneider et al. .................. 74/473.1 |
| 2011/0224855 A1* | 9/2011 | Schneider et al. .................. 701/22 |
| 2011/0224858 A1* | 9/2011 | Bissontz .................. 701/22 |
| 2011/0224877 A1* | 9/2011 | Faucett et al. .................. 701/56 |
| 2011/0231046 A1* | 9/2011 | Bissontz .................. 701/22 |
| 2012/0158232 A1* | 6/2012 | Banerjee et al. .................. 701/22 |
| 2012/0167857 A1* | 7/2012 | Barnes et al. .................. 123/198 R |
| 2012/0207620 A1* | 8/2012 | Dalum et al. .................. 417/44.1 |
| 2012/0266701 A1* | 10/2012 | Yamada et al. .................. 74/15.82 |
| 2013/0292195 A1* | 11/2013 | Gibson et al. .................. 180/53.1 |

FOREIGN PATENT DOCUMENTS

| | | |
|---|---|---|
| JP | 2000-125402 A | 4/2000 |
| JP | 2001-204104 A | 7/2001 |
| JP | 2001-298803 A | 10/2001 |
| JP | 2002-199506 A1 | 7/2002 |
| JP | 2003-220843 A1 | 8/2003 |
| JP | 2004-176624 A | 6/2004 |
| JP | 2005-245104 A | 9/2005 |

* cited by examiner

ACCESSORY DRIVE MECHANISM FOR HYBRID VEHICLE

TECHNICAL FIELD

The present invention relates to a mechanism for driving various accessories in a hybrid vehicle (a hybrid electric vehicle) that may be traveled with driving force generated by an electric motor (a traveling motor) merely.

BACKGROUND ART

In a conventional vehicle 100J that is not a hybrid vehicle, as shown in FIG. 20, an accessory 11 is provided to an engine 11, and rotation of the engine 1 is used for driving the accessory 11 through a driving force transmitting mechanism 20.

In FIG. 20, the rotation of the engine 1 of the vehicle 100J is transmitted to a clutch 2, a transmission 3, a propeller shaft 4, a differential gear 5, a rear axle 6, and rear wheels 7, as the above-mentioned order.

In the example of FIG. 20, since an accessory driving source is the engine 1, the accessory does not operate in a case that the engine 1 is stopped, and there is an inconvenience that steering suddenly becomes heavy occurs, for example.

Even in a hybrid vehicle, in a case the vehicle is traveling, it is necessary to operate accessories, such as a pump driving a power steering (said pump is so-called "power steering pump"), a compressor supplying compressed air for a brake and others (said compressor is so-called "air compressor"), a compressor compressing a refrigerant in a vehicle air conditioner (said compressor is so-called "air-conditioner compressor"), and others, it is necessary to assure operations of various accessories.

In order to drive such accessories, for example, in a hybrid vehicle 101J shown in FIG. 21, an accessory 11 being provided to an engine 1 is driven by utilizing rotation force of the engine 1 through a driving force transmitting mechanism 20, as like as the conventional vehicle 100J shown in FIG. 20.

Reference numeral 8 in FIG. 21 denotes a motor which can operates as a generator also and is typical to a hybrid vehicle (said motor is described as a "traveling motor" hereinafter), the motor 8 is interposed between a clutch 2 and a transmission 3. Any other constructions are equal to those shown in FIG. 10.

According to the constructions shown in FIG. 21, in a case that a time period is short in which period the traveling motor 8 operates while the engine 1 is stopped, the engine 1 may be used as an accessory driving power transmitting mechanism and the accessory 11 may be operated by power of the traveling motor 8.

However, in case that the traveling time is prolonged in which time the traveling motor 8 operates, resistance loss in an idling of the engine 1 consumes a large amount of traveling motor driving energy. Therefore, in the example of FIG. 21, a degree of "improvement of fuel efficiency", as a primary object of the example, is relatively low.

An another prior art is proposed, for example, as shown in FIG. 22, in which an accessory 11 is driven by an accessory driving motor 12e and a traveling motor 8 (refer to Patent Document 1).

In the prior art in FIG. 22, although a construction is simple, in case that switching timing of a clutch 6a is inaccurate (the switching timing is messed up), it is highly possible that power interference of the traveling motor 8 and the accessory driving motor 12e is occurred, and that, the accessory driving motor 12e and/or a transmitting mechanism are damaged.

Furthermore, although operating conditions of a pump driving power steering (a power steering pump) and/or a compressor supplying compressed air (an air compressor) are greatly different from those of an air-conditioner compressor circulating a refrigerant in an air conditioner, such a difference in operating conditions is not taken into consideration and it is a problem.

According to a prior art shown in FIG. 23 (refer to Patent Document 1), an accessory driving system has double constructions.

In the prior art shown in FIG. 23, since the power interference in the prior art shown in FIG. 22 does not occur, reliability thereof is relatively high.

However, since there are the double constructions in the accessory driving system thereof, there are problems that the constructions thereof are complicated and that an initial cost is expensive.

Further, there are not disclosures that operating conditions of the power steering pump and/or the air compressor are greatly different from those of the air-conditioner compressor.

In a prior art (refer to Patent Document 2) shown in FIG. 24, an accessory driving system has double constructions, as like as the prior art shown in FIG. 23.

Therefore, since the accessory driving system has the double constructions as like as the prior art shown in FIG. 24, there are problems that the constructions thereof are complicated and that an initial cost is expensive.

Furthermore, it is not solved that operating conditions of the power steering pump and/or the air compressor are greatly different from those of the air-conditioner compression.

In a prior art (see Patent Document 2) shown in FIG. 25, an accessory driving system has double constructions.

Therefore, there is not solution for problems that constructions thereof are complicated, the initial cost is expensive, and that operating conditions of the power steering pump and/or the air compressor are greatly different from those of the air-conditioner compressor.

PRIOR ART DOCUMENTS

Patent Documents

Patent Document 1: Japanese Patent No. 3611731
Patent Document 2: Japanese Patent No. 3685246

SUMMARY OF INVENTION

Problem to be Solved by Invention

The present invention is provided in view of the above-described problems of the prior art, and an object of the present invention is to provide an accessory drive mechanism for a hybrid vehicle which can assure operations of accessories in any traveling conditions and can smoothly switch a driving power source of the accessory between a power being transmitted from a traveling motor and a power transmitted from an accessory driving motor.

Means for Solving Problem

An accessory drive mechanism 100 of a hybrid vehicle according to the present invention comprises a drive power take-off mechanism 20 which takes out a power from a traveling drive system having an engine 1 and a traveling motor 8, an accessory (11: a power steering pump 11A, an air compressor 11B, and others) is connected to the drive power take-off mechanism 20, a first one-way clutch C1, which can transmit a power to the accessory 11 side merely, is interposed between the drive power take-off mechanism 20 and the accessory 11, an accessory driving motor (an accessory motor 12e) is connected to the accessory 11 on an opposite side of the drive power take-off mechanism 20, a second one-way clutch C2, which can transmit a power to the accessory 11 side merely, is interposed between the accessory 11 and the accessory driving motor 12, the first one-way clutch C1 transmits revolutions but the second one-way clutch C2 does not transmit revolutions in a case that a number of revolutions Nd being transmitted from the drive power take-off mechanism 20 to the accessory 11 is higher than a number of revolutions (Nm) (including a number of revolutions in a stop condition: Nm=0) being transmitted from the accessory driving motor 12 to the accessory 11, and the second one-way clutch C2 transmits revolutions but the first one-way clutch C1 does not transmit revolutions in a case that the number of revolutions Nm being transmitted from the accessory driving motor 12 to the accessory 11 is higher than the number of revolutions Nd being transmitted from the drive power take-off mechanism 20 to the accessory 11.

Here, it is preferable that the accessory 11 includes a pump for driving power steering (so-called "power steering pump" 11A), a compressor for supplying compressed air (so-called "air compressor" 11B), and an air-conditioner compressor for compressing a refrigerant in an air conditioner (a so-called "air-conditioner compressor" 11C). It should be noted that the above-described members are typical accessories, but an alternator, an oil pump of an engine, a water pump, and others are required as other accessories depending on circumstances or conditions.

Further, it is preferable that the power is transmitted from the drive power take-off mechanism 20 to a first accessory system M1 being connected to the pump (the so-called "power steering pump" 11A) and the compressor for supplying the compressed air (the so-called "air compressor" 11B) and a second accessory system M2 being connected to the air-conditioner compressor 11C, a first accessory driving motor (an accessory driving motor 12A for the power steering pump and the air compressor) is connected to the first accessory system M1, the first and second one-way clutches (C11 and C12) are interposed in the first accessory system M1, a second accessory driving motor (an accessory driving motor 12C for the air-conditioner compressor) is connected to the second accessory system M2, and that the first and second one-way clutches C21 and C22 are interposed in the second accessory system M2.

In the present invention, it is preferable that a revolution measurement device 52 for measuring the number of revolutions of the traveling drive system and a control device 50 are provided, a measurement result (the number of revolutions of a traveling drive system) of the revolution measurement device 52 is input to the control device 50, and that the control device 50 has a function of stopping the first and second accessory driving motors 12A and 12C in a case that the measurement result (the number of revolutions Nd of the traveling drive system) of the revolution measurement device 52 is not lower than a predetermined number of revolutions (a low revolution N1 being close to an engine idling speed of the engine) and a function of driving the first accessory driving motor 12A in a case that a measurement result of the revolution measurement device 52 is lower than the predetermined number of revolutions N1.

Furthermore, it is preferable that a signal indicating whether the air conditioner operates (an air-conditioner ON/OFF signal 53) is input to the control device 50, and the control device 50 has a function of driving the second accessory driving motor 12C in a case that the measurement result of the revolution measurement device 52 is lower than the predetermined number of revolutions N1 and the air conditioner operates (the air-conditioner "ON" signal 53 is input to the control device 50).

In the present invention, it is preferable that the drive power take-off mechanism 20 includes an accessory system M3 being connected to the pump (the so-called "power steering pump" 11A) and the compressor for supplying the compressed air (the so-called "air compressor" 11B), a power distribution mechanism 32 which takes out a driving power is interposed between the second one-way clutch C2 and the pump (the so-called "power steering pump" 11A) and the compressor for supplying the compressed air (the so-called "air compressor" 11B) in the accessory system M3, the power distribution mechanism 32 is connected to the air-conditioner compressor 11C, and a clutch (an electromagnetic clutch 40) is provided between the power distribution mechanism 32 and the air-conditioner compressor 11C.

In the present invention, it is preferable that a revolution measurement device 52 which measures the number of revolutions of the traveling drive system D and a control device 50 are provided, a measurement result of the revolution measurement device 52 (a number of revolution of the traveling drive system) and a signal indicating whether the air conditioner operates (the air-conditioner ON/OFF signal 53) are input to the control device 50, the control device 50 has a function of stopping the accessory driving motor 12A in a case that the measurement result (the number of revolutions Nd of the traveling drive system D) of the revolution measurement device 52 is not lower than a predetermined number of the revolutions (the low revolution N1 being close to the engine idling speed of the engine) and a function of driving the first accessory driving motor 12A in a case that the measurement result of the revolution measuring device 52 is lower than the predetermined number of revolutions N1, and that the control device 50 has a function of disengaging the clutch 40 in a case that the air conditioner does not operate (the air-conditioner "OFF" signal 53 is input to the control device 50) and a function of engaging the clutch 40 in a case that the air conditioner operates (the air-conditioner "ON" signal 53 is input to the control device 50).

Moreover, an accessory drive mechanism for a hybrid vehicle according to the present invention comprises a drive power take-off mechanism 20 which takes out power from a traveling drive system including an engine 1 and a traveling motor 8 by means of a wrapping-type transmission mechanism, an accessory 11 (a power steering pump, an air compressor, an air compressor, or the like) is connected to the drive power take-off mechanism 20 via a gearbox G0, an output shaft 36 of the drive power take-off mechanism 20 and an output shaft 12 of an accessory driving motor 12e (an accessory motor) are connected to the gearbox G0, a first braking device 16 (a clutch/brake mechanism on the traveling motor 8 side) is interposed in an output shaft So of the drive power take-off mechanism 20, a second braking device 18 (an accessory motor brake) is interposed in the output shaft 12 of the accessory driving motor 12e, the accessory drive mechanism comprises a revolution measurement device 52 which measures a number of revolutions of the traveling drive system and a control device 60, a measurement result (the number of revolutions of the traveling drive system) of the revolution measurement device 52 is input to the control device 60, and the control device 60 has functions of stopping the accessory driving motor 12e, operating the second braking device 18 (effecting the braking device 18) and releasing the first braking device 16 (releasing the brake and engage the clutch in the clutch/brake mechanism 16) in a case that a number of revolutions transmitted from the traveling drive system is not lower than a predetermined number of revolutions N1 (the low revolution being close to an engine idling speed of the engine) and functions of driving the accessory driving motor 12e, operating the first braking device 16 (effecting the brake and disengaging the clutch in the clutch/brake mechanism 16) and releasing the second braking device 18 (loosen the braking device 18) in a case that a number of revolutions transmitted from the traveling drive system is lower than the predetermined number of revolutions N1.

Here, as the accessory 11, there are a pump 11A for driving a power steering (a so-called "power steering pump"), an engine lubricant pump, a compressor 11B for supplying compressed air (a so-called "air compressor"), an air-conditioner compressor 11C for compressing a refrigerant in an air conditioner (a so-called "air conditioner compressor"), and others.

Additionally, it is preferable that the output shaft So of the drive power take-off mechanism 20 and the output shaft 12 of the accessory driving motor 12e are coaxially arranged in the gearbox G0, the gearbox G0 comprises:

a ring gear 26 including internal teeth therein and being provided at an output shaft end portion of the drive power take-off mechanism 20;

a plurality of planetary gears 28 including external teeth which engage with the internal teeth of the ring gear 26;

a sun gear 30 including external teeth which engage with the external teeth of the planetary gears 28; and a planetary gear carrier 32c connecting to rotation centers of the planetary gears 28 and integrally revolving with revolution of the planetary gears 28 along the external teeth of the sun gear 30, the sun gear 30 is provided at an output shaft end portion of the accessory driving motor 12e, the planetary gear carrier 32c includes a rotating shaft being coaxial with the output shaft 12 of the accessory driving motor 12e and can rotate relatively to the output shaft 12 of the accessory driving motor 12e, external teeth are formed on an outer edge portion 32a in a radial direction of the planetary gear carrier 32c, a first gear 35 that is externally engaged with the external teeth of the planetary gear carrier 32c, and a rotating shaft of the first gear 35 is connected to a pump 11A for driving power steering (the so-called "power steering pump) and a compressor 11B for supplying compressed air (the so-called "air compressor").

Alternatively, it is preferable that the output shaft So of the drive power take-off mechanism 20 and the output shaft 12 of the accessory driving motor 12e are coaxially arranged in the gearbox G0, first and second pinion gears 70 and 71 are provided to the output shaft So of the drive power take-off mechanism 20 and the output shaft 12 of the accessory driving motor 12e, respectively, a pair of third pinion gears 72 which are externally engaged with each of a pair of first and second pinion gears 70 and 71 respectively (which is constructed by the first pinion gear 70 being provided to the output shaft So of the drive power take-off mechanism 20 and the second pinion gear 71 being provided to the output shaft 12 of the accessory driving motor 12e) are provided, the pair of third pinion gears 72 include an identical rod-like member 74 (a rotating shaft for the pinion gears 72) as a rotation center, a ring gear 76 is provided which includes external teeth formed thereon and rotates integrally with the rod-like member 74, a first gear 35A is provided which is externally engaged with the external teeth of the ring gear 76, and a rotating shaft 36 of the first gear 35 is connected to a pump for driving the power steering 11A (the so-called "power steering pump") and the compressor 11B for supplying compressed air (the so-called "air compressor").

Further, it is preferable that a second gear 37A being externally engaged with the first gear 35A is provided, a rotating shaft 38 of the second gear 37A is connected to an air-conditioner compressor 11C for compressing a refrigerant in an air conditioner (a so-called "air-conditioner compressor"), and that a clutch 40 (an electromagnetic clutch) is interposed in the rotating shaft 38 of the second gear 37A.

In this case, it is preferable that a signal indicative of whether the air conditioner operates (the air-conditioner "ON/OFF" signal) is input to the control device 60, and that the control device 60 has a function of disengaging the clutch 40 in a case that the air conditioner does not operate (the air-conditioner "OFF" signal is input to the control device) and a function of engaging the clutch 40 in a case that the air conditioner operates (the air-conditioner "ON" signal is input to the control device).

Effect of the Invention

According to the present invention being constructed as mentioned above, since the accessory driving motor 12 is provided, the power steering pump 11A, the air compressor 11B, and the air-conditioner compressor 11C can be operated in a case that the hybrid vehicle travels by means of the traveling motor 8 alone, in other words, in a case that a power generated by an internal-combustion engine is not transmitted to travel the hybrid vehicle, in various kinds of facilities or commercial districts for example.

Furthermore, according to the present invention, by means of the first and second one-way clutches C1 and C2, it is possible to tolerate margins of error in switching timing upon switching between the power transmitted from the traveling drive system (D: side of the internal-combustion engine and/or the traveling motor) and the power transmitted from the accessory driving motor 12, in a simple construction.

Moreover, the power transmitted from the traveling drive system D and the power transmitted from the accessory driving motor 12 do not interfere with each other, and thereby, damage due to overload in the power transmitting system M can be prevent.

Here, it is sufficient for the accessory driving motor 12 to assure a number of revolutions slightly higher than the number of revolutions corresponding to low revolution N1, which is near an engine idling speed of the engine, in a case that the number of revolutions is converted to revolutions of the traveling drive system D, and therefore, an electric power consumed by the accessory driving motor 12 can be economized to the minimum level thereof.

As a result, according to the present invention, by means of simplifying the construction and the control process, a reliability of the mechanism is improved and an introduction cost is reduced.

Additionally, in the present invention, in a case that the signal indicating whether the air conditioner operates (the air-conditioner "ON/OFF" signal 53) can be input to the control device 50, a power required for driving the accessory for the air conditioner (the air-conditioner compressor 11C for compressing the refrigerant in the air conditioner), which accessory operates or stops irrespectively of a traveling condition, can be assuredly transmitted from the traveling drive system D or the accessory driving motor 12C for an air-conditioner.

Further, according to the present invention, the power transmitted from the traveling drive system (the internal-combustion engine or traveling motor side) and the power transmitted from the accessory driving motor 12e can be easily and smoothly switched through the simple construction by operating and/or releasing the first braking device (the clutch/brake mechanism 16) and the second braking device 18.

Furthermore, the power transmitted from the traveling drive system and the power transmitted from the accessory driving motor 12e do not interfere with each other, and then, a damage due to overload in the power transmitting system can be prevented.

Here, in the present invention, since the accessory driving motor 12e is stopped and the second braking device 18 operates in a case that the driving force should be transmitted from the traveling drive system (the internal-combustion engine or traveling motor side), the second braking device 18 does not operate in a case that the accessory driving motor 12e operates, and then, the accessory driving motor 12e is not damaged.

On the other hand, in a case that the driving force should be transmitted from the accessory driving motor 12e, the first braking device 16 operates. Here, for example, in a case that the first braking device 16 is constructed by the clutch/brake mechanism and that the brake operates and the clutch is disengaged in the clutch/brake mechanism when the first braking device 16 is operated, the traveling drive system (the internal-combustion engine or traveling motor side) is not damaged.

That is, according to the present invention, an accessory power can be transmitted from the traveling drive system (the internal-combustion engine or traveling motor side), or it can be also transmitted from the accessory driving motor 12e. Furthermore, members transmitting the driving force are prevented from a damage, even though the first braking device 16 and the second braking device 18 operate.

Here, in a case that revolutions are converted into revolutions of the power transmitting system, since it is sufficient for the accessory driving motor 12e to assure a number of revolutions, e.g. the number of revolutions being slightly higher than the number of revolutions corresponding to the low revolution N1 which is close to the engine idling speed of the engine, electric power consumed in the accessory driving motor 12e can be economized to low power.

As a result, according to the present invention, by simplifying the construction and the control, a reliability of the mechanism is improved and an introduction cost is reduced.

Further, in the present invention, in a case that it is constructed so as to input the signal indicating whether the air conditioner operates (the air-conditioner "ON/OFF" signal) to the control device 60, a power required for driving the air-conditioner accessory (the air-conditioner compressor for compressing the refrigerant in the air conditioner), which accessory operates or does not operate irrespective of the traveling condition, can be assuredly transmitted from the traveling drive system or accessory driving motor 12e for the air-conditioner.

BEST MODE(S) FOR CARRYING OUT THE INVENTION

An embodiment according to the present invention will now be described with reference to the accompanying drawings.

A description will be first given on a first embodiment with reference to FIG. 1 to FIG. 5.

Figure 1:
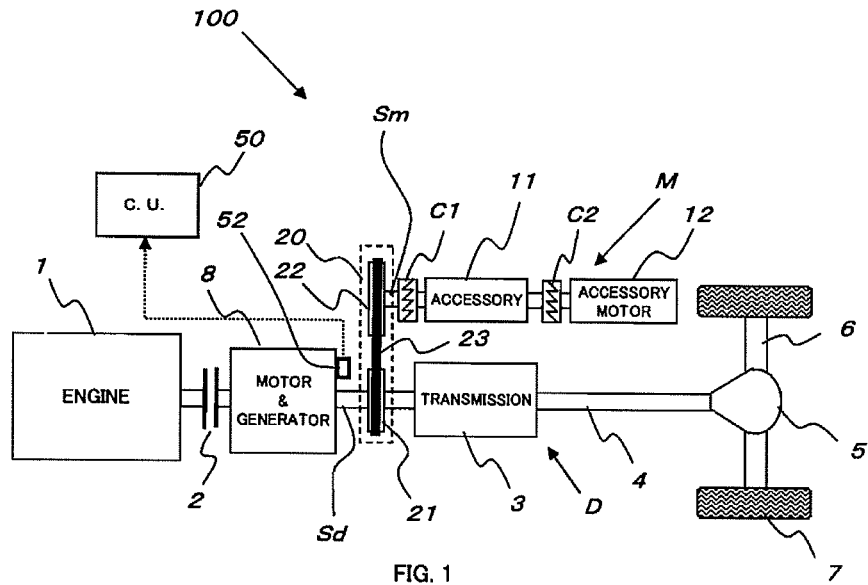
FIG. 1 is a block diagram of a first embodiment according to the present invention.

In FIG. 1, an accessory drive mechanism for a hybrid vehicle denoted by reference numeral 100 as a whole has an engine 1, a traveling drive system D, a drive power take-off mechanism 20, and an accessory system M.

The traveling drive system D has a clutch 2, a traveling motor which also serves as an electric generator (which will be referred to as a "traveling motor" hereinafter) 8, a transmission 3, a propeller shaft 4, a differential 5, a rear axle 6, and rear wheels 7. The traveling motor 8 operates as a motor at the time of start and operates as an electric generator at the time of deceleration.

The drive power take-off mechanism 20 is constructed by a first pulley 21, a second pulley 22, and a belt engaged with the two pulleys 21 and 22 in the example shown in FIG. 1.

The first pulley 21 is secured to a shaft Sd that connects the traveling motor 8 to the transmission 3. On the other hand, the second pulley 22 is secured to one end of a shaft group Sm concatenated on the same axis of the accessory system M. Here, although the shaft group Sm is constructed by a plurality of shafts, it is represented as one shaft in FIG. 1 for simplicity of the drawing.

The drive power take-off mechanism 20 is not restricted to a belt transmitting mechanism, and it may be any other wrapping-type transmission mechanism or any other rotation transmitting mechanism.

The accessory system M has an accessory 11 interposed in the shaft group Sm, an accessory driving motor 12 that drives the accessory 11, a first one-way clutch C1, and a second one-way clutch C2.

The accessory driving motor 12 is connected to the other end side of the shaft group Sm. Here, the accessory driving motor 12 comprehensively represents accessory driving motors (two in FIG. 2) connected to a plurality of types of accessory systems, respectively.

The accessory 11 is interposed between the second pulley 22 and an accessory motor 12e in the shaft group Sm. For example, as shown in FIG. 2, there are actually a plurality of accessories 11, and the accessory 11 in FIG. 1 comprehensively represents the plurality of accessories.

Figure 2:
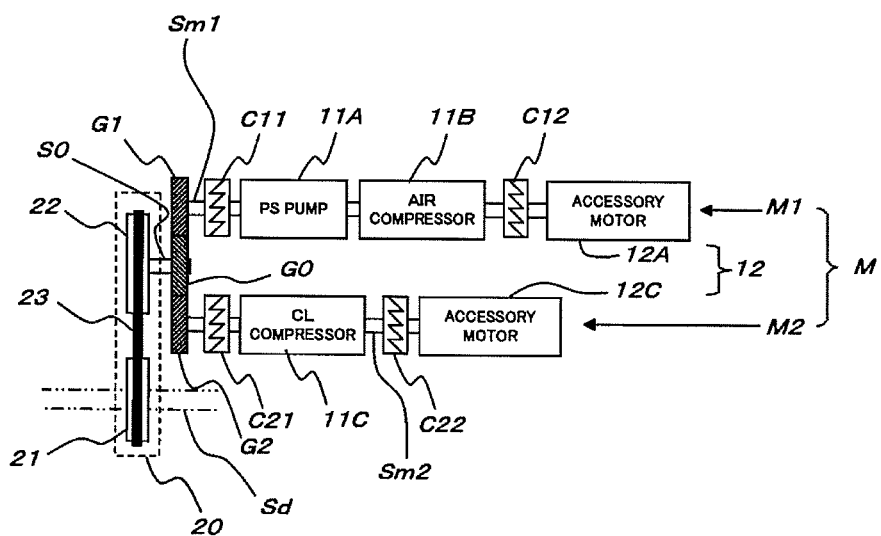
FIG. 2 is a block diagram of an accessory drive system in FIG. 1.

The first one-way clutch C1 (each one-way clutch is present in each of the accessory systems which are actually two in number: see FIG. 2) is interposed in a region between the second pulley 22 and the accessory 11 in the shaft group Sm. Furthermore, the second one-way clutch C2 (each one-way clutch is present in each of the accessory systems which are actually two in number: see FIG. 2) is interposed in a region between the accessory 11 and the accessory motor 12e in the shaft group Sm.

The first one-way clutch C1 transmits power from the drive power take-off mechanism 20 to the accessory 11 side alone (the power in the right direction alone is transmitted in FIG. 1).

On the other hand, the second one-way clutch C2 transmits power from the accessory driving motor 12 to the accessory 11 side alone (the power in the left direction alone is transmitted in FIG. 1).

The accessory drive mechanism 100 according to the first embodiment is constructed in such a manner that the first one-way clutch C1 transmits revolutions and the second one-way clutch C2 does not transmit revolutions in a case that the number of revolutions Nd transmitted from the drive power take-off mechanism 20 to the accessory 11 is higher than the number of revolutions Nm transmitted from the accessory driving motor 12 to the accessory 11.

On the other hand, the same is constructed in such a manner that the second one-way clutch C2 transmits revolutions and the first one-way clutch C1 does not transmit revolutions in a case that the number of revolutions Nm transmitted from the accessory driving motor 12 to the accessory 11 is higher than the number of revolutions Nd transmitted from the drive power take-off mechanism 20 to the accessory 11.

As shown in FIG. 2, the accessory system M in FIG. 1 is constructed by, e.g., two systems, and it includes a first accessory system M1 and a second accessory system M2.

In FIG. 2, the first accessory system M1 includes a first one-way clutch C11, a power steering pump 11A, an air compressor 11B, a second one-way clutch C12, and an accessory driving motor 12A that are interposed in the shaft group Sm1. A gear G1 is secured to one end of the shaft group Sm1, and an accessory driving motor 12A is connected to the other end of the same.

Here, the term shaft group Sm1 is a generic name of a shaft that couples the gear G1 with the first one-way clutch C11, a shaft that couples the first one-way clutch C11 with the power steering pump 11A, a shaft that couples the power steering pump 11A with the air compressor 11B, a shaft that couples the air compressor 11B with the second one-way clutch C12, and a shaft that couples the second one-way clutch C12 with the accessory driving motor 12A.

The power steering pump 11A and the air compressor 11B are interposed in a region between the gear G1 and the accessory driving motor 12A in the shaft group Sm1. A positional relationship between the power steering pump 11A and the air compressor 11B in FIG. 2 may be reversed.

The first one-way clutch C11 is interposed between the gear G1 and the power steering pump 11A in the shaft group Sm1. Furthermore, the second one-way clutch C12 is interposed between the air compressor 11B and the accessory driving motor 12A in the shaft group Sm1.

The second accessory system M2 includes a first one-way clutch C21, an air-conditioner compressor 11C, a second one-way clutch C22, and an accessory driving motor 12C that are interposed in the shaft group Sm2. A gear G2 is secured to one end of the shaft group Sm2, and the accessory driving motor 12C is connected to the other end of the same.

Here, the term shaft group Sm2 is a generic name of a shaft that couples the gear G2 with the first one-way clutch C21, a shaft that couples the first one-way clutch C21 with the air-conditioner compressor 11C, a shaft that couples the air-conditioner compressor 11C with the second one-way clutch C22, and a shaft that couples the second one-way clutch C22 with the accessory driving motor 12C.

The air-conditioner compressor 11C is interposed in a region between the gear G2 and the accessory driving motor 12C in the shaft group Sm2.

The first one-way clutch C21 is interposed between the gear G2 and the air-conditioner compressor 11C in the shaft group Sm2. Moreover, the second one-way clutch C22 is interposed between the air-conditioner compressor 11C and the accessory driving motor 12C in the shaft group Sm2.

A gear G0 is secured to a shaft S0 of the second pulley 22 in the drive power take-off mechanism 20, and the gear G1 and the gear G2 engage with the gear G0.

The accessory drive mechanism 100 of a hybrid vehicle in FIG. 1 includes a control unit 50 as controlling means and a motor revolution detecting sensor 52.

The motor revolution detecting sensor 52 is attached to the traveling motor 8 to detect the number of revolutions of the traveling motor 8. Here, the traveling motor 8 rotates in cases that the vehicle travels using the engine 1 and that the vehicle travels using the traveling motor 8.

Figure 3:
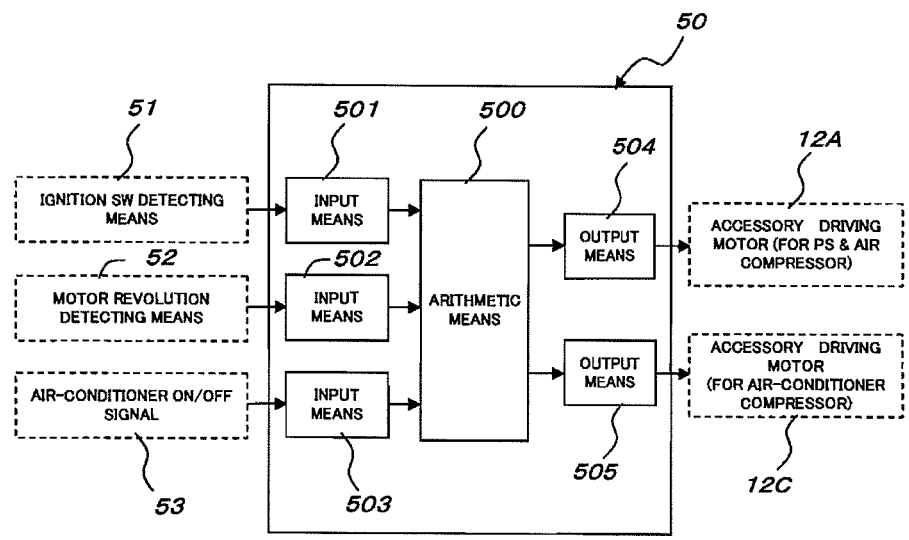
FIG. 3 is a block diagram showing a control system according to the first embodiment.

In FIG. 3, the control unit 50 includes arithmetic means 500, input means 501, 502, and 503, and output means 504 and 505.

The input means 501 inputs ON and OFF signals detected by ignition switch detecting means 51 to the arithmetic means 500. The ignition switch detecting means 51 detects ON and OFF of an ignition switch.

The input means 502 inputs the number of revolutions of the motor detected by the motor revolution detecting sensor 52 to the arithmetic means 500.

The input means 503 inputs an air-conditioner ON/OFF signal detection device 53 to the arithmetic means 500. The air-conditioner ON/OFF signal detection device 53 detects ON and OFF signals of a vehicle air conditioner.

The output means 504 transmits ON and OFF control signals to the accessory driving motor 12A (the power steering and air compressor motor) that drives the power steering pump 11A and the air compressor 11B (see FIG. 2) interposed in the first accessory system M1 based on an arithmetic result obtained from the arithmetic means 500.

The output means 505 transmits ON and OFF control signals to the accessory driving motor 12C (the air-conditioner compressor motor) that drives the air-conditioner compressor 11C (see FIG. 2) interposed in the second accessory system M2 based on an arithmetic result obtained from the arithmetic means 500.

Figure 5:
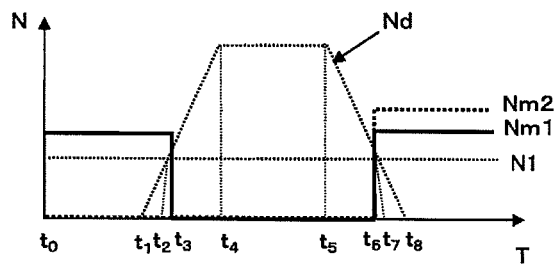
FIG. 5 is a characteristic view showing an operation pattern of an accessory in the first embodiment.

FIG. 5 is a graph showing control characteristics (control patterns) of the accessory driving motors 12A and 12C in which an abscissa represents a time and an ordinate represents the number of revolutions of each motor. Nm1 denotes the number of revolutions of the accessory driving motor 12A (the power steering and air compressor motor); Nm2, the number of revolutions of the accessory driving motor 12C (the air-conditioner compressor motor); and Nd, the number of revolutions of the traveling motor 8, and reference character N1 represents that the engine 1 exhibits a predetermined value slightly higher (e.g., 50 rpm) than the engine idling speed.

In FIG. 5, the traveling motor 8 and the air-conditioner compressor motor 12C are stopped at a time t0, start at a time t1, reach fixed revolutions at a time t4, decelerate at a time t5, and stop at a time t8. Additionally, the accessory driving motor 12A rotates at a time t0, stops at a time t3 passing a time t2 near which the traveling motor 8 exceeds a predetermined number of revolutions N1, and drives the accessory driving motors 12A and 12C at a time t6 close to a time t7 at which the traveling motor 8 reaches the predetermined number of revolution N1 after decelerating at a time t5.

Here, a pulley ratio of the drive power take-off mechanism 20 or a gear ratio of the gears G0, G1, and G2 is determined on a case-by-case basis and not restricted to 1.0. Further, the number of revolutions Nm1 may be higher than the number of revolutions Nm2 in some cases depending on the gear ratio.

In the following description, both the number of revolutions Nm1 of the power steering/air compressor motor 12A and the number of revolutions Nm1 of the air-conditioner compressor motor 12C are values associated with (converted into) the number of revolutions Nd of the traveling motor while considering the pulley ratio or the gear ratio in the middle of a path.

As shown in FIG. 3, in the first embodiment, information concerning the number of revolutions of the traveling motor 8 is input to the control unit 50 from the motor revolution detecting sensor 52.

In FIG. 5, if the information from the motor revolution detecting sensor 52 reveals that the number of revolutions Nd of the traveling motor 8 is higher than the predetermined number of revolutions (the number of revolutions N1 close to the engine idling speed of the engine), the control unit 50 controls to stop the accessory driving motors 12A and 12C.

On the other hand, if a measurement result (Nd) of the motor revolution detecting sensor 52 falls below the predetermined number of revolutions N1, the control unit 50 controls to drive the accessory driving motors 12A and 12C.

In FIG. 5, the air-conditioner deriving motor 12C is stopped even though the number of revolutions Nd of the traveling motor 8 falls below the predetermined number of revolutions N1 immediately after start because a case that the air-conditioner is not operated is assumed at this point in time.

Here, the predetermined number of revolutions N1 is converted into the number of revolutions of a traveling drive system D and appropriately set (e.g., the number of revolutions higher than the engine idling speed by 50 rpm).

Furthermore, in a case that an ON/OFF signal 53 of the air conditioner is input and a measurement result of the motor revolution detecting sensor 52 is lower than the predetermined number of revolutions N1, the control unit 50 controls to drive the air-conditioner compressor motor 12C.

A description will now be given as to control of the accessory drive mechanism 100 according to the first embodiment with reference to a flowchart of FIG. 4 as well as FIG. 1 to FIG. 3.

Figure 4:
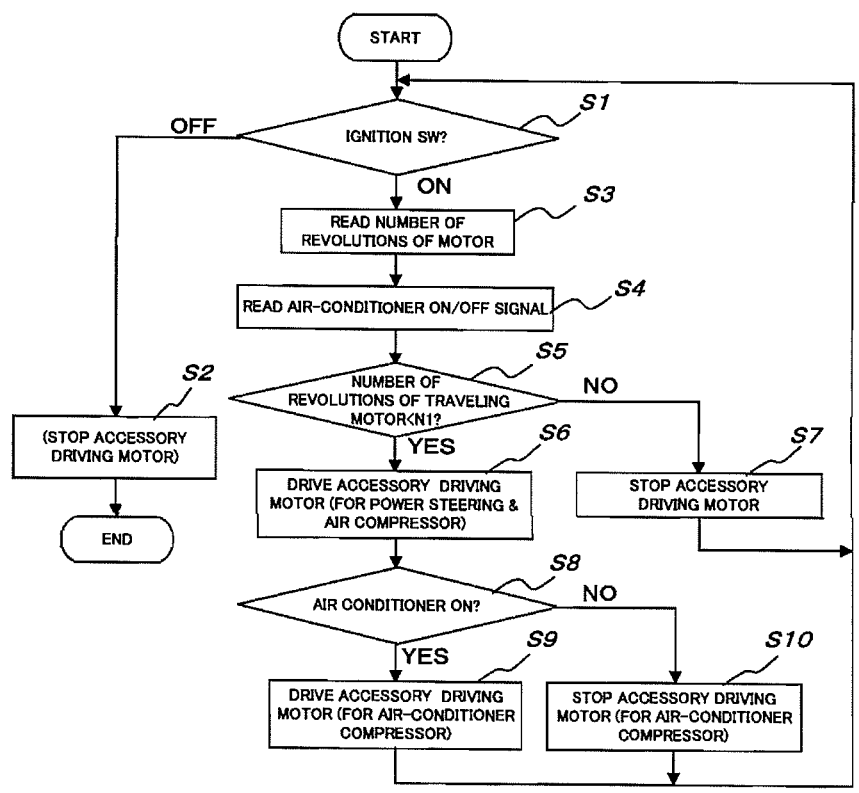
FIG. 4 is a flowchart showing control of accessory driving according to the first embodiment.

At a step S1 in FIG. 4, a state of the ignition switch is checked to determine whether the ignition switch is ON or OFF. If the ignition switch is OFF (OFF at the step S1), the vehicle does not travel, and hence control is not performed while maintaining the stopped state of the accessory driving motor (a step S2). On the other hand, if the ignition switch is ON (ON at the step S1), the motor revolution detecting sensor 52 is used to read the number of revolutions of the traveling motor 8 at a step S3, and the processing advances to a step S4.

At the step S4, whether an air-conditioning equipment (the air conditioner) of the vehicle operates (ON/OFF) is determined. That is, an ON/OFF signal of the air conditioner is read. Furthermore, the processing advances to a step S5.

At the step S5, the control unit 50 determines whether the number of revolutions Nd of the traveling motor 8 is less than the predetermined value N1.

Here, the predetermined number N1 is the number of revolutions close to the engine idling speed of the engine 1, and it is also the number of revolutions slightly higher (e.g., 50 rpm) than the engine idling speed.

The processing advances to a step S6 if the number of revolutions Nd of the traveling motor 8 is less than the predetermined number N1 (YES at the step S5), and the processing advances to a step S7 if the number of revolutions Nd of the traveling motor 8 is not lower than the predetermined value N1 (NO at the step S5).

At the step S6, it is determined that the power steering pump 11A and the air compressor 11B (see FIG. 2) interposed in the first accessory system M1 should be rotated by the power steering and air compressor motor 12A rather than the engine 1 or the traveling motor 8. Therefore, the power steering and the air compressor motor 12A are driven. Moreover, the processing advances to the step S8.

On the other hand, at the step S7, it is determined that the power steering pump 11A, the air compressor 11B, and the air-conditioner compressor 11C (see FIG. 2) should be driven by the engine 1 or the traveling motor 8 rather than the accessory driving motors 12A and 12C. Therefore, the accessory driving motors 12A and 12C are stopped, and the processing returns to the step S1.

After returning to the step S1, the step S1 and the subsequent steps are again repeated.

Here, the processing of the step S4 may be executed after the processing of the step S6.

At the step S8, the control unit 50 uses the ON/OFF signal of the air conditioner to determine whether the non-illustrated air conditioner is ON (operated) or OFF (not operated).

In a case that the air conditioner is ON (operated) (YES at the step S8), the air-conditioner compressor driving motor 12C is driven (a step S9), the processing returns to the step S1, ad the step S1 and the subsequent steps are again repeated.

In a case that the air conditioner is OFF (not operated) (NO at the step S8), the air-conditioner compressor driving motor 12C is stopped (a step S10), the processing returns to the step S1, and the step S1 and the subsequent steps are again repeated.

Although not clearly shown in the drawing, even in a case that the number of revolutions Nd of the traveling motor 8 is not smaller than the predetermined value N1 and the accessory driving motors 12A and 12C are stopped (a loop of NO at the step S5), the control unit 50 likewise uses the air conditioner ON/OFF signal to determine whether the non-illustrated air conditioner is ON (operated) or OFF (not operated).

Additionally, in a case that the air conditioner is ON (operated), the air conditioner compressor 11C is driven from the drive power take-off mechanism 20 by the engine 1 or the traveling motor 8 through the one-way clutch C21.

According to the first embodiment, since the accessory driving motor 12 (12A, 12C) is provided, the power steering pump 11A, the air compressor 11B, and the air conditioner compressor 11C can be operated even in case of allowing the hybrid vehicle to travel using the traveling motor 8 alone rather than the engine (an internal-combustion engine) in, e.g., various kinds of facilities or commercial districts.

Further, according to the first embodiment, in a case that the first and second one-way clutches C1 and C2 are used, margins of error of switching timing can be tolerated by a simple construction when switching power transmitted from the traveling drive system D and power transmitted from the accessory motors 12A and 12C.

Furthermore, the power transmitted from the traveling drive system D and the power transmitted from the accessory driving motors 12A and 12C do not interfere with each other, whereby the power transmitting system M can be prevented from being damaged due to overload.

Here, since it is sufficient for the accessory driving motors 12A and 12C to assure the number of revolutions slightly higher than the number of revolutions corresponding to low revolution N1 close to the engine idling speed of the engine, electric power consumed by the accessory driving motors 12A and 12C can be suppressed to a minimum level.

Furthermore, according to the first embodiment, since the construction and the control are simple, reliability of the mechanism can be improved, and an introduction cost can be reduced.

Moreover, since the ON/OFF signal of the air conditioner is input to the control unit 50, power required for driving the air-conditioner compressor 11C that enters the operating state or the non-operating state irrespective of the traveling condition is assuredly transmitted from the traveling drive system D or the air-conditioner compressor driving motor 12C.

A second embodiment will now be described with reference to FIG. 6 to FIG. 8.

In the first embodiment, as shown in FIG. 2, the two divided accessory system M1 and M2 are provided with the accessory driving motors 12A and 12C, respectively.

Figure 6:
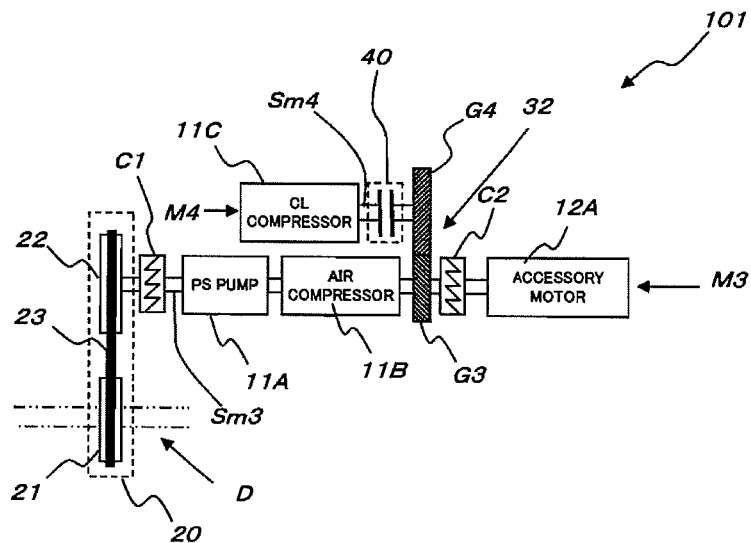
FIG. 6 is a block diagram of an accessory drive system according to a second embodiment.

On the other hand, in the second embodiment shown in FIG. 6, although an accessory system is divided into two systems M3 and M4, only one accessory driving motor (12A) is provided.

In FIG. 6, reference numeral 101 denotes an entire accessory drive mechanism according to the second embodiment. The accessory drive mechanism 101 has a drive power take-off mechanism 20, a power distribution mechanism 32, and the accessory systems M3 and M4.

A construction of the drive power take-off mechanism 20 is the same as that in the first embodiment.

A second pulley 22 of the drive power take-off mechanism 20 is secured to one end of a shaft group Sm3 of the accessory system M3. Further, the other end of the shaft group Sm3 is connected to a drive shaft of the accessory driving motor 12A.

The power distribution mechanism 32 includes a gear G3 and a gear G4.

Here, the term shaft group Sm3 is a generic name of a shaft that couples the second pulley 22 of the drive power take-off mechanism 20 with a first one-way clutch C11, a shaft that couples the first one-way clutch C11 with a power steering pump 11A, a shaft that couples the power steering pump 11A with an air compressor 11B, a shaft that couples the air compressor 11B with the gear G3 of a power distribution mechanism 32, a shaft that couples the gear G3 with a second one-way clutch C12, and a shaft that couples the second one-way clutch C12 with the accessory driving motor 12A.

In the shaft group Sm3, the power steering pump 11A and the air compressor 11B are interposed between the second pulley 22 and the accessory driving motor 12A.

In the shaft group Sm3, the first one-way clutch C1 is interposed between the second pulley 22 and the power steering pump 11A.

In the shaft group Sm3, the second one-way clutch C2 is interposed between the air compressor 11B and the accessory driving motor 12A.

In the shaft group Sm3, the gear G3 of the power distribution mechanism 32 is secured between the air compressor 11B and the second one-way clutch C2.

Here, in a case that the number of revolutions Nd transmitted from the drive power take-off mechanism 20 to the power steering pump 11A and the air compressor 11B is higher than the number of revolutions Nm transmitted from the accessory driving motor 12A to the accessory power steering pump 11A and the air compressor 11B, the first one-way clutch C1 alone transmits the revolutions, and the second one-way clutch C2 is prevented from transmitting the revolutions.

Further, in a case that the number of revolutions Nm transmitted from the accessory driving motor 12A to the power steering pump 11A and the air compressor 11B is higher than the number of revolutions Nd transmitted from the drive power take-off mechanism 20 to the power steering pump 11A and the air compressor 11B, the second one-way clutch C2 alone transmits the revolutions, and the first one-way clutch C1 is prevented from transmitting the revolutions.

The accessory system M4 has an air-conditioner compressor 11C, a drive shaft Sm4, and an electromagnetic clutch 40.

One end of the drive shaft Sm4 is connected to the air-conditioner compressor 11C, and the gear G4 of the power distribution mechanism 32 is secured to the other end of the same.

Here, the drive shaft sm4 is a generic name of a shaft that couples the gear G4 with the electromagnetic clutch 4 and a shaft that couples the electromagnetic clutch G4 with the air-conditioner compressor 11C.

In the drive shaft Sm4, the electromagnetic clutch 40 is interposed between the air-conditioner compressor 11C and the gear G4.

Although not shown in FIG. 6, the accessory drive mechanism 101 in the second embodiment comprises a control unit 50A as controlling means and a motor revolution detecting sensor 52.

Figure 7:
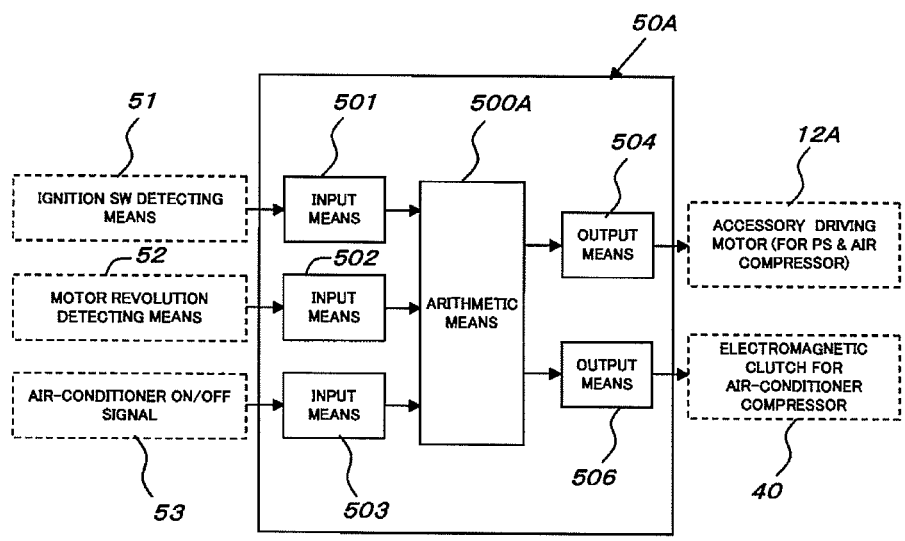
FIG. 7 is a block diagram of a control system according to the second embodiment.

FIG. 7 shows a construction of the control unit 50A.

In FIG. 7, the control unit 50A includes arithmetic means 500A, input means 501, 502, and 503, and output means 504 and 506.

The input means 501 inputs ON and OFF signals detected by ignition switch detecting means 51 to the arithmetic means 500A.

The input means 502 inputs a detection signal indicative of the number of revolutions of the motor detected by the motor revolution detecting sensor 52 to the arithmetic means 500A.

The input means 503 inputs an air-conditioner ON/OFF signals supplied from an air-conditioner ON/OFF signal detection device 53 to the arithmetic means 500A.

The output means 504 transmits ON and OFF control signals to the power steering and air compressor motor 12A based on an arithmetic result obtained from the arithmetic means 500A.

The output means 506 transmits control signals indicative of "disengagement" and "engagement" to the electromagnetic clutch 40 for the air-conditioner compressor based on an arithmetic result of the arithmetic means 500A.

A description will now be given as to an operation/non-operation of the accessory driving motor 12A and "disengagement" and "engagement" control over the electromagnetic clutch 40 for the air-conditioner compressor mainly based on a flowchart of FIG. 8 with reference to FIG. 6 and FIG. 7.

Figure 8:
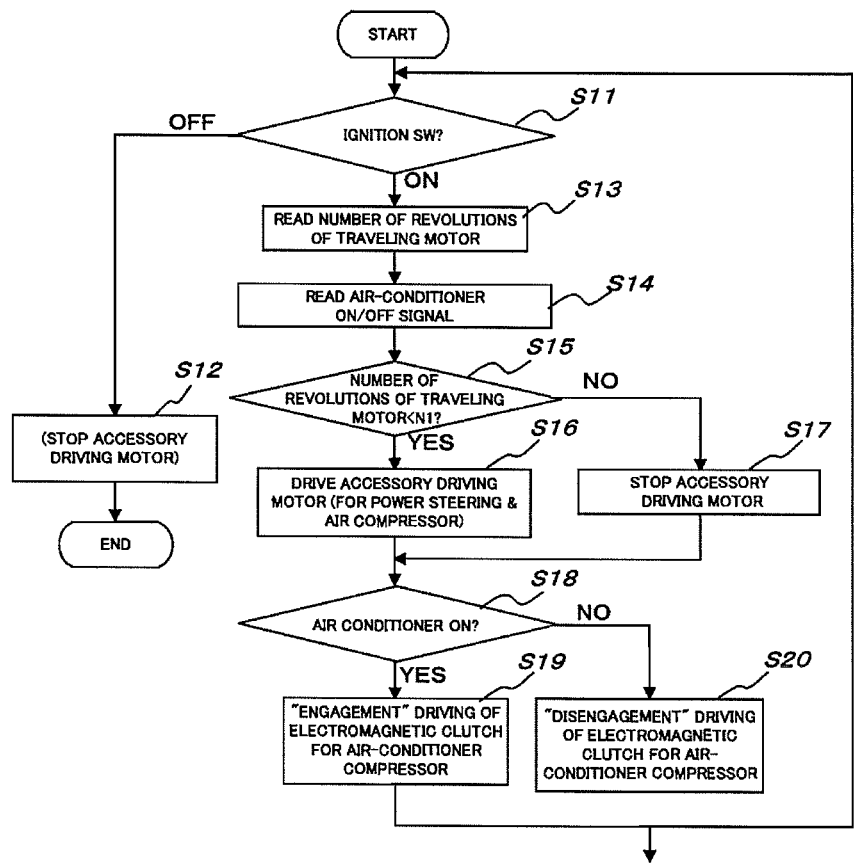
FIG. 8 is a flowchart showing control of accessory driving according to the second embodiment.

At a step S11 in FIG. 8, a state of an ignition switch is checked to determine whether the ignition switch is ON or OFF.

If the ignition switch is OFF (OFF at the step S11), a vehicle does not travel, the accessory driving motor is stopped (a step S12), and hence control is not performed. On the other hand, if the ignition switch is ON (ON at the step S11), the processing advances to a step S13 where the motor revolution detecting sensor 52 is used to read the number of revolutions of a traveling motor 8.

Furthermore, the processing advances a step S14, ON/OFF of the air conditioner is determined based on a signal supplied from the air-conditioner ON/OFF signal detection device 53. Moreover, the processing advances to a step S15.

At the step S15, the control unit 50A determines whether the number of revolutions Nd of the traveling motor is less than a predetermined number N1.

Like the first embodiment, the predetermined number N1 is the number of revolutions slightly higher (e.g., 50 rpm) than an engine idling speed of an engine 1.

In a case that the number of revolutions Nd of the traveling motor is less than the predetermined number N1 (YES at the step S15), the processing advances to a step S16. On the other hand, in a case that the number of revolutions Nd of the traveling motor is not smaller than the predetermined number N1 (NO at the step S15), the processing advances to a step S17.

At the step S16, it is determined that the power steering pump 11A and the air compressor 11B should be driven using the accessory driving motor 12A rather than the engine or the traveling motor, thereby driving the power steering and air compressor motor 12A. Additionally, the processing advances to a step S18.

On the other hand, at the step S17, it is determined that the power steering pump 11A and the air compressor 11B should be driven using the engine or the traveling motor rather than the accessory driving motor 12A, the accessory driving motor 12A is stopped, and the processing advances to a step S18.

Here, the processing of the step S14 may be executed after the processing of the step S16.

At the step S18, the control unit 50A determines whether the non-illustrated air-conditioning unit (the air conditioner) is ON (operated) or OFF (not operated) based on an air-conditioner ON/OFF signal.

In a case that the air conditioner is ON (operated) (YES at the step S18), the electromagnetic clutch 40 for the air-conditioner compressor is engaged (S19), the processing returns to the step S11, and the step S11 and the subsequent steps are again repeated.

In a case that the air conditioner is OFF (not operated) (NO at the step S18), the electromagnetic clutch 40 for the air-conditioner compressor is disengaged (a step S20), the processing returns to the step S11, and the step S11 and the subsequent steps are again repeated.

Here, in the operation and non-operation of the air conditioner, "disengagement (disconnection)" and "engagement" of the electromagnetic clutch 40 are absolutely imperative.

Therefore, in the control shown in FIG. 8, the control of the steps S18 to S20 is executed in both a case that the accessory driving motor 12A performs driving (the step S16) and a case that it does not perform driving (the step S17).

As compared with the first embodiment shown in FIG. 1 to FIG. 5, since the numbers of the accessory driving motors is reduced by one in the second embodiment shown in FIG. 6 to FIG. 8, and hence an initial cost can be reduced to be lower than that in the first embodiment.

Constructions and effects other than those described above in the second embodiment depicted in FIG. 6 and FIG. 7 are equal to those in the first embodiment.

Figure 9:
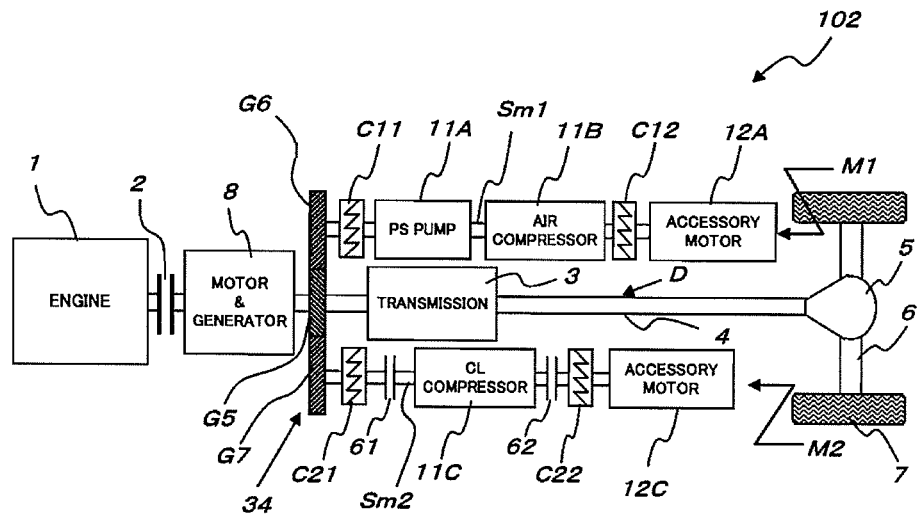
FIG. 9 is a block diagram showing a third embodiment.

FIG. 9 shows a third embodiment.

In the second embodiment shown in FIG. 6, the drive power take-off mechanism 20, the one accessory driving motor 12A, and the power distribution mechanism 32 are used as the power source for accessory driving.

On the other hand, in the third embodiment depicted in FIG. 9, power distribution mechanism 34 and two accessory driving motors 12A and 12C are used as a power source for accessory driving.

The third embodiment will now be described hereinafter with reference to FIG. 9.

In FIG. 9, an accessory drive mechanism denoted by reference numeral 102 as a whole has a traveling drive system D, two accessory systems M1 (a first accessory system) and M2 (a second accessory system), and a power distribution mechanism 34.

The power distribution mechanism 34 includes three gears G5, G6, and G7.

The gear G5 is secured between a traveling motor 8 and a transmission 3 in the traveling drive system D.

Here, the power distribution mechanism 34 is not restricted to a gear transmitting mechanism. A wrapping-type transmission mechanism or any other mechanism can be used.

The first accessory system M1 comprises a first one-way clutch C11, a power steering pump 11A, an air compressor 11B, a second one-way clutch C12, and an accessory driving motor 12A that are interposed in a shaft group Sm1. The gear G6 is secured to one end of the shaft group Sm1, and the accessory motor 12A is connected to the other end of the same.

The power steering pump 11A and the air compressor 11B are interposed in a region between the gear G6 and the accessory motor 12e in the shaft group Sm1. It is to be noted that a positional relationship of the power steering pump 11A and the air compressor 11B in the example shown in FIG. 9 may be reversed.

Here, each of the shaft group Sm1 and the shaft group Sm2 comprehensively represents a plurality of shafts like the first embodiment.

The first one-way clutch C11 is interposed between the gear G6 and the power steering pump 11A in the shaft group Sm1. Further, the second one-way clutch C12 is interposed between the air compressor 11B and the accessory motor 12e in the shaft group Sm1.

The second accessory system M2 comprises a first one-way clutch C21, a first electromagnetic clutch 61, an air-conditioner compressor 11C, a second electromagnetic clutch 62, a second one-way clutch C22, and the accessory driving motor 12C that are interposed in the shaft group Sm2.

The gear G7 is secured to one end of the shaft group Sm2, and the accessory driving motor 12C is connected to the other end of the same.

The air-conditioner compressor 11C is interposed in a region between the gear G7 and the accessory motor 12C in the shaft group Sm2.

The first one-way clutch C21 is interposed between the gear G7 and the air-conditioner compressor 11C in the shaft group Sm2 on the gear G7 side, and the first electromagnetic clutch 61 is interposed between the same on the air-conditioner compressor 11C side.

Moreover, the second electromagnetic clutch 62 is interposed between the air-conditioner compressor 11C and the accessory driving motor 12C in the shaft group Sm2 on the air-conditioner compressor 11C side, and the second one-way clutch C22 is interposed between the same on the accessory driving motor 12C side.

Additionally, both the gear G6 and the gear G7 engage with the gear G5.

Here, in the first accessory drive system M1, in a case that the number of revolutions Nd transmitted from the drive power take-off mechanism 20 to the power steering pump 11A and the air compressor 11B is higher than the number of revolutions Nm transmitted from the accessory driving motor 12A to the accessory power steering pump 11A and the air compressor 11B, the first one-way clutch C1 alone transmits the revolutions, and the second one-way clutch C2 does not transmit the revolutions.

On the other hand, in a case that the number of revolutions Nm transmitted from the accessory driving motor 12A to the power steering pump 11A and the air compressor 11B is higher than the number of revolutions Nd transmitted from the drive power take-off mechanism 20 to the power steering pump 11A and the air compressor 11B, the second one-way clutch C2 alone transmits the revolutions, and the first one-way clutch C1 does not transmit the revolutions.

Further, in the second accessory drive system M2, in a case that the number of revolutions Nd transmitted from the drive power take-off mechanism 20 to the air-conditioner compressor 11C is higher than the number of revolutions Nm transmitted from the accessory driving motor 12C to the air-conditioner compressor 11C, the first one-way clutch C21 alone transmits the revolutions, and the second one-way clutch C22 does not transmit the revolutions.

On the other hand, in a case that the number of revolutions Nm transmitted from the accessory driving motor 12C to the air-conditioner compressor 11C is higher than the number of revolutions Nd transmitted from the drive power take-off mechanism 20 to the air-conditioner compressor 11C, the second one-way clutch C22 alone transmits the revolutions, and the first one-way clutch C21 does not transmit the revolutions.

Constructions and effects other than those described above in the modification shown in FIG. 9 are equal to those in the second embodiment depicted in FIG. 6 to FIG. 8.

Figure 10:
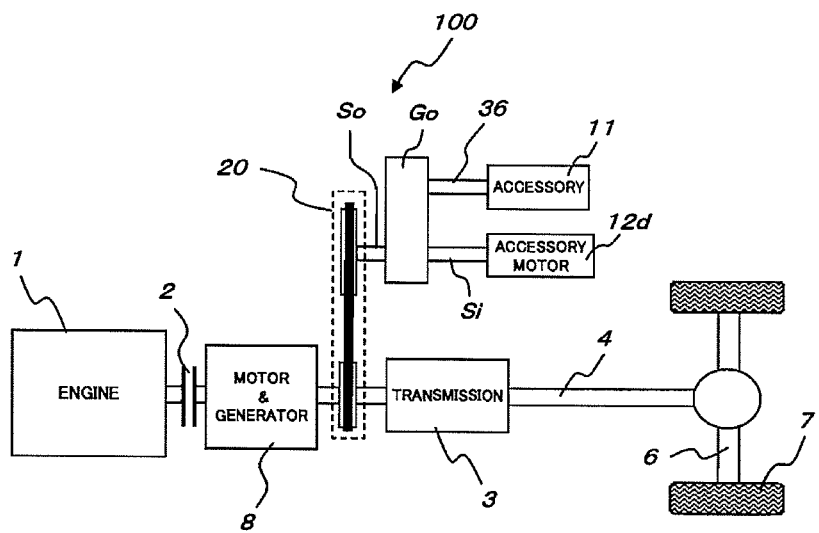
FIG. 10 is a block diagram of a fourth embodiment according to the present invention.

In FIG. 10, a clutch 2 is connected to an engine 1 as an internal-combustion engine. A traveling motor 8 is connected to the clutch 2.

Here, the traveling motor 8 also has an operation as an electric motor and an operation as an electric generator. That is, the traveling motor 8 operates as the electric generator at the time of traveling using the engine 1, and it operates as the electric motor at the time of traveling using the traveling motor 8.

A rear axle 6 is connected to the traveling motor 8 through a transmission 3 and a propeller shaft 4.

The drive power take-off mechanism 20 that takes out power using, e.g., a wrapping-type transmission mechanism is provided between the traveling motor 8 and the transmission 3. Here, the drive power take-off mechanism 20 is not restricted to the wrapping-type transmission mechanism, and a gear transmission or any other transmitting mechanism can be applied.

The drive power take-off mechanism 20 operates as an input device of the accessory drive mechanism designated by reference numeral 100 as a whole. The drive power take-off mechanism 20 is connected to a gearbox G0 through an output shaft So.

A plurality of accessories 11 are connected to the gearbox G0 through an output shaft 36. It is to be noted that the output shaft 36 is shown as a single shaft in FIG. 10 to simplify the drawing, and the plurality of accessories 11 are also represented as a single block.

An accessory driving motor 12d is connected to the gearbox Go through an output shaft Si.

Figure 11:
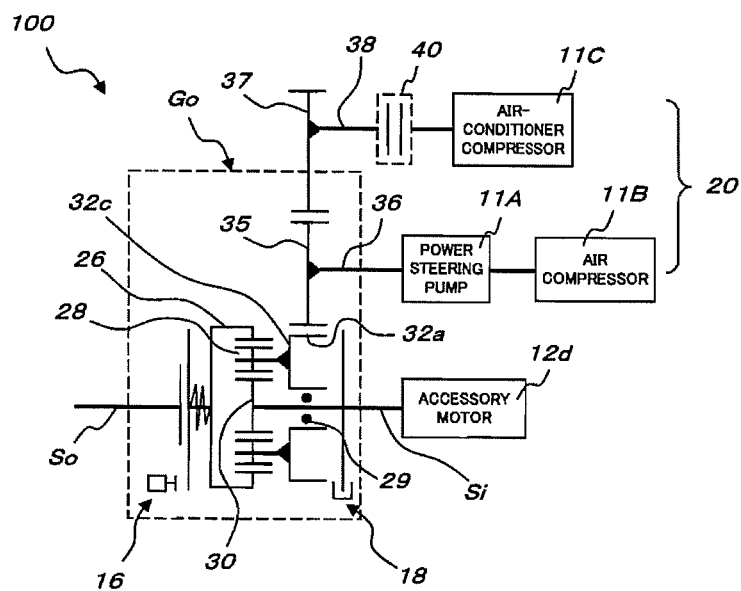
FIG. 11 is a block diagram showing a gearbox in the fourth embodiment.

FIG. 11 shows particulars of the gearbox G0 in the accessory drive mechanism 100.

In FIG. 11, a clutch/brake mechanism 16 (a first braking device) is disposed to the output shaft So of the drive power take-off mechanism 20. A ring gear 26 is disposed to the output shaft So at the rear (a side apart from the drive power take-off mechanism 20: the right side in FIG. 11) of the clutch/brake mechanism 16.

A plurality of planetary gears 28 are inscribed with respect to internal teeth of the ring gear 26. A sun gear 30 is externally engaged with the planetary gears 28.

The plurality of planetary gears 28 are supported by a planetary carrier 32 so as to allow their rotational movement. This planetary carrier 32 is provided concentrically with the sun gear 30 at the rear (the side apart from the drive power take-off mechanism 20: the right side in FIG. 11) of the sun gear 30.

A rotating shaft of the sun gear 30 is fixed to the output shaft Si, and the output shaft Si is connected to the accessory driving motor 12d. The planetary carrier 32 is disposed to the output shaft Si by a bearing 29 so as to allow its rotational movement.

Here, the output shaft Si and the output shaft So are concentrically arranged. Further, the output shaft Si and the output shaft So are constructed so as to enable relative rotation.

On the output shaft Si, a braking device 18 (a second braking device) is disposed in a region between the planetary carrier 32 and the accessory driving motor 12d. The second braking device 18 is a brake on the accessory driving motor 12e side.

A first gear 35 is externally engaged with a gear formed on an outer side edge portion 32a of the planetary carrier 32 in a radial direction (a vertical direction in FIG. 11) thereof. Furthermore, a rotating shaft 36 of the first gear 35 is coupled with the power steering pump 11A and the air compressor 11B in a so-called "tandem state".

Moreover, a second gear 37 is externally engaged with the first gear 35. Additionally, a rotating shaft 38 of the second gear 37 is coupled with the air-conditioner compressor 11C through an electromagnetic clutch 40.

Here, although not shown, the second gear 37 can be constructed so as to directly engage with the gear formed on the outer side edge portion 32a of the planetary carrier 32 in the radial direction.

The clutch/brake mechanism 16 disposed to the output shaft So will now be described with reference to FIG. 12.

As shown in FIG. 12(a), the clutch/brake mechanism 16 has a clutch 80, a brake actuator 82, and a spring 84.

The clutch 80 is provided with two face plates 85 and 87, and the face plate on the ring gear 26 side is denoted by reference numeral 85 in the illustrated embodiment. Additionally, the face plate 85 is coupled with the ring gear 26 side (the right side in FIG. 12) of the output shaft So, and the face plate 87 is coupled with a side of the output shaft So apart from the ring gear 26 (the drive power take-off mechanism 20 side: the left side in FIG. 12).

The brake actuator 82 has a function of expanding or contracting a rod 83 having a stopper member at an end thereof.

The spring 84 presses the face plate 85 on the ring gear 26 side against the opposed face plate 87.

In a state shown in FIG. 12(a), the clutch/brake mechanism 16 is "releasing" (the clutch is engaged to release the face plate 85 on the ring gear 26 side).

In this state, the brake actuator 82 contracts the rod 83, and hence the stopper member at the end of the rod 83 is not in contact with the face plate 85. Further, the face plate 85 is pressed against the face plate 87 by elastic repulsive force of the spring 84.

As a result, rotation of the output shaft So is transmitted to the ring gear 26 as indicated by an arrow G.

On the other hand, in a state depicted in FIG. 12(b), the clutch/brake mechanism 16 is "braking" (the clutch is released to brake the face plate 85 on the ring gear 26 side).

Figure 12:
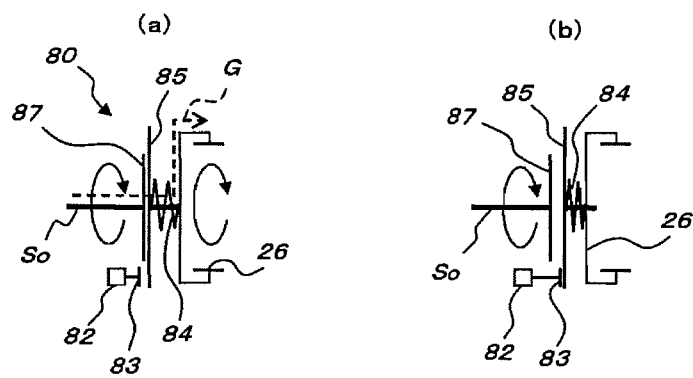
FIG. 12 is a block diagram showing an operation of a clutch/brake mechanism.

That is, in FIG. 12(b), the brake actuator 82 expands the rod 83 to bring the stopper member at the end of the rod 83 into contact with the face plate 85, thereby pressing the face plate 85 toward the ring gear 26 side (the right side in FIG. 12).

As a result, the face plate 85 moves toward the ring gear 26 side against the elastic repulsive force of the spring 84, and the face plate 85 and the face plate 87 are apart from each other. Therefore, the rotation of the output shaft So is interrupted between the face plate 85 and the face plate 87.

Furthermore, the rotation of the face plate 85 is braked by frictional resistance produced in a case that the stopper member at the end of the rod 83 comes into contact with the face plate 85. Therefore, the ring gear 26 is stopped (fixed).

Figure 13:
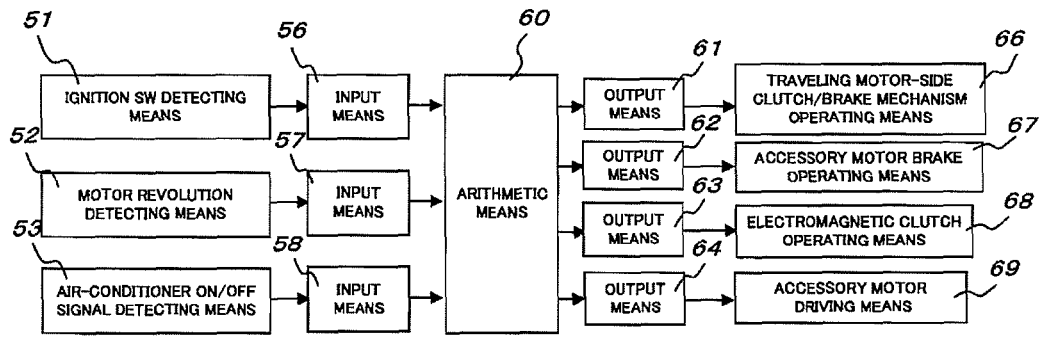
FIG. 13 is a block diagram of a control device in the fourth embodiment.

FIG. 13 shows a control mechanism for the accessory drive mechanism 100 according to the first embodiment.

In FIG. 13, the ignition switch detecting means 51, the traveling motor revolution detecting means 52, and the air-conditioner ON/OFF signal detecting means 53 are connected to the control device 60 through the respective input means 56, 57, and 58.

The control device 60 is connected to traveling motor-side clutch/brake mechanism operating means 66, accessory driving motor brake operating means 67, electromagnetic clutch operating means 68, and accessory driving motor driving means 69 through output means 61, 62, 63, and 64 based on signals from the respective input means 56, 57, and 58.

As a result, control signals "driving" and "stop" are transmitted to the accessory driving motor 12e, control signals "braking" (an operation of disengaging the clutch to brake the face plate 85 on the ring gear 26 side) and "releasing" (an operation of engaging the clutch to release the face plate 85 on the ring gear 26 side) are transmitted to the clutch/brake mechanism 16, control signals "braking" and "releasing" are transmitted to the second braking device 18, and control signals "engagement" and "disengagement" are transmitted to the electromagnetic clutch 40.

Control of the embodiment shown in FIG. 10 will now be described with reference to FIG. 14.

Figure 14:
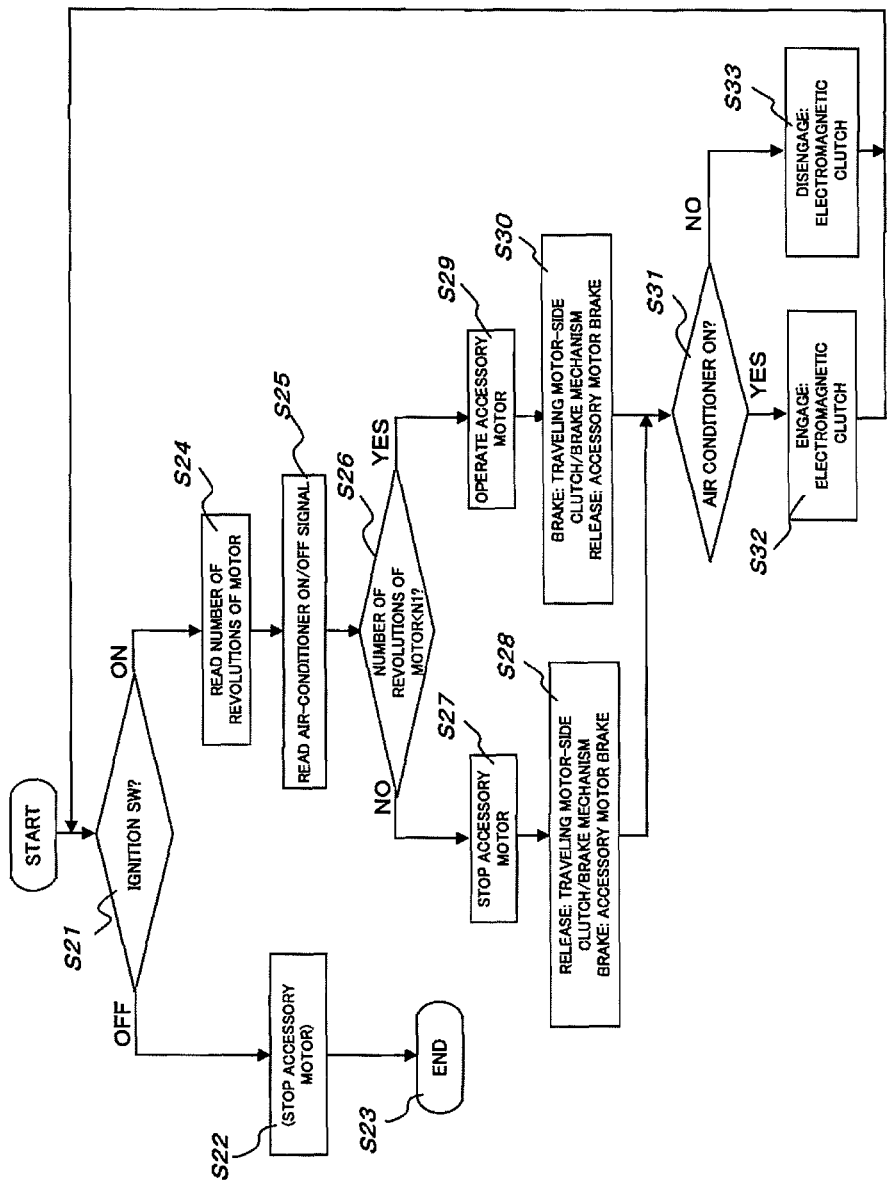
FIG. 14 is a flowchart showing control in the fourth embodiment.

In FIG. 14, the ignition switch detecting means 51 determines whether the ignition switch is ON or OFF (a step S21).

If the ignition switch is OFF (OFF at the step S21), since a hybrid vehicle is at a stop, the accessory driving motor 12e is stopped (a step S22) to terminate the control (a step S23).

At the step S21, if the ignition switch is ON (ON at the step S21), the processing advances to a step S24 where the traveling motor revolution detecting means 52 is used to read the number of revolutions of the traveling motor 8. Then, an air-conditioner ON/OFF signal is read by the air-conditioner ON/OFF signal detecting means 53 (a step S25). Although not shown, the operation of reading the air-conditioner ON/OFF signal at the step S25 can be executed immediately before a later-described step S31.

Subsequently, a judgment is made upon whether the number of revolutions of the traveling motor 8 is lower than a predetermined number of revolutions (e.g., the number of revolutions that is 50 rpm higher than an engine idling speed of the engine 1) the number of revolutions N1 that is slightly higher than the engine idling speed of the engine (see FIG. 10) (a step S26).

If the number of revolutions of the traveling motor 8 is lower than the predetermined number of revolutions N1 (YES at the step S26), the accessory driving motor 12e is driven with the number of revolutions required for driving the power steering pump 11A and the air compressor 11B (a step S29).

Further, the clutch/brake mechanism 16, which is a brake on the traveling motor side, is braked, and the second braking device 18, which is a brake on the accessory driving motor side, is released (a step S30). As a result, the revolutions of the accessory driving motor 12e alone are transmitted to the power steering pump 11A and the air compressor 11B, and the revolutions from the traveling motor 8 (see FIG. 10) side are not transmitted to the same. After the step S30, the processing advances to a step S31.

On the other hand, at a step S26, if the number of revolutions of the traveling motor 8 is not lower than the predetermined number of revolutions N1 (NO at the step S26), the accessory driving motor 12e is stopped (a step S27).

Furthermore, the clutch/brake mechanism 16 on the traveling motor 8 side is released, and the second braking device 18 on the accessory driving motor 12e side is braked (a step S28). As a result, the revolutions from the traveling motor 8 (see FIG. 10) side alone are transmitted to the power steering pump 11A and the air compressor 11B, and the revolutions of the accessory driving motor 12e are not transmitted.

Since the transmission of the driving force is assured for the power steering pump 11A and the air compressor 11B at the steps S27, S28, S29, and S30, the operation is assuredly carried out as required. After the step S27, the processing advances to a step S31.

At the step S31, the air-conditioner ON/OFF signal is used to determine whether the air-conditioner compressor 11C is operated (ON) or not operated (OFF). If the air-conditioner compressor 11C is ON (YES at the step S31), the electromagnetic clutch 40 is engaged (a step S32) to transmit the revolutions from the traveling motor 8 (see FIG. 10) side or the revolutions from the accessory driving motor 12e to the air-conditioner compressor 11C. Moreover, the processing returns to the step S21.

If the air-conditioner compressor 11C is OFF (NO at the step S31), the electromagnetic clutch 40 is disengaged (a step S33) to prevent the revolutions from the traveling motor 8 or the accessory driving motor 12e from being transmitted to the air-conditioner compressor 11C. Additionally, the processing returns to the step S21.

In the control shown in FIG. 14, a relationship between times and the numbers of revolutions of the respective motors, i.e., the traveling motor, the air-conditioner compressor motor, the power steering pump motor, and the air compressor motor is as shown in FIG. 5. Therefore, a description will be given hereinafter with reference to FIG. 5.

As shown in FIG. 5, the number of revolutions of the traveling motor 8 is lower than the predetermined number of revolutions N1 immediately after start of a vehicle, and the power steering pump 11A and the air compressor 11B are driven by the accessory driving motor 12e as indicated by a solid line. Therefore, as characteristics indicated by the solid line in FIG. 5 (characteristics of the accessory driving motors 12e concerning the revolutions of the power steering pump 11A and the air compressor 11B), the number of revolutions of the traveling motor 8 rises as the number of revolutions slightly higher than the predetermined number of revolutions in a region where the number of revolutions of the traveling motor 8 is lower than the predetermined number of revolutions N1.

Here, in the example shown in FIG. 5, the air conditioner is not operated and the air-conditioner compressor 11C is not rotated in a state that the number of revolutions of the traveling motor 8 is not greater than the predetermined number of revolutions N1 immediately after start of the vehicle. Therefore, in the example shown in FIG. 5, as characteristics indicated by a bold dotted line (characteristics of the accessory driving motor 12e concerning the air-conditioner compressor 11C), the number of revolutions of the traveling motor 8 does not rise immediately after start of the vehicle in the region where the number of revolutions of the traveling motor 8 is lower than the predetermined number of revolutions N1.

In a case that the number of revolutions of the traveling motor 8 is higher than the predetermined number of revolutions N1, the power steering pump 11A, the air compressor 11B, or the air-conditioner compressor 11C is driven by the revolutions from the traveling motor 8 side, and the accessory driving motor 12e is stopped. Therefore, in a region where the number of revolutions of the traveling motor 8 is higher than the predetermined number of revolutions N1, as characteristics indicated by a solid line (characteristics of the accessory driving motor 12e concerning the revolutions of the power steering pump 11A or the air compressor 11B) and characteristics of a bold dotted line (characteristics of the accessory driving motor 12e concerning the revolutions of the air-conditioner compressor 11C), the number of revolutions is zero.

In a case that the number of revolutions of the traveling motor 8 is reduced to be lower than the predetermined number of revolutions N1, the power steering pump 11A, the air compressor 11B, and the air-conditioner compressor 11C are driven by the accessory driving motor 12e. Therefore, in FIG. 5, in a case that the number of revolutions of the traveling motor 8 is reduced to be lower than the predetermined number of revolutions N1, characteristics indicated by the solid line and the rough dotted line rise.

It is to be noted that the number of revolutions of the air-conditioner compressor is different from the number of revolutions of the power steering or air compressor is based on a difference in number of teeth between the first gear 35 and the second gear 37. The numbers of revolutions of both the members differ on a case-by-case basis.

Figure 15:
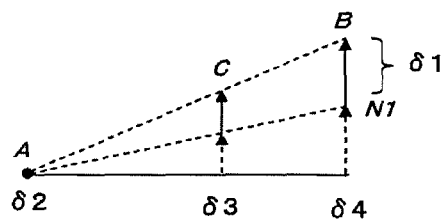
FIG. 15 is a drawing indicating the respective numbers of revolutions of a sun gear, a planetary gear carrier, and a ring gear when driven by a traveling motor.

FIG. 15 shows the respective numbers of revolutions of a sun gear 30 being as a driving gear in a case that they are driven by the traveling motor 8, a planetary gear carrier 32c, and a ring gear 26.

In FIG. 15, in a case that the traveling motor 8 is used to drive the accessory 11, the number of revolutions of the sun gear 30 driven by the accessory driving motor 12e is zero (A). In a case that the traveling motor 8 rotates at the predetermined number of revolutions N1 or above, the accessory 11 is driven by the traveling motor 8, and the number of revolutions of the ring gear 26 is (B). Further, the number of revolutions of the planetary gear carrier 32c for driving the accessory is (C).

In FIG. 15, reference character δ1 represents that "the accessory is driven by the traveling motor in a case that the traveling motor is equal to or above N1", reference character δ represents "the sun gear driven by the accessory motor", reference character δ3 represents "the accessory driving planetary gear carrier", and reference character δ4 represents "the ring gear driven by the traveling motor".

Figure 16:
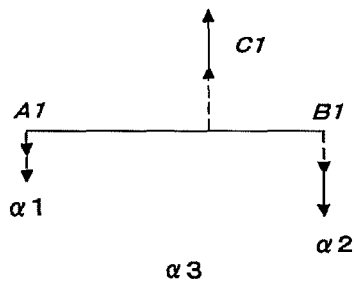
FIG. 16 is a drawing indicating a state of torque of each gear in FIG. 15.

FIG. 16 shows a state of torque in FIG. 15. In FIG. 16, the second braking device 18 on the accessory driving motor side generates negative torque (A1), the ring gear 26 on the traveling motor 8 side is braked with negative torque (B1), and the planetary gear carrier 32c that drives the accessory 11 generates positive torque (C1).

In FIG. 16, reference character α1 denotes "accessory motor-side brake holding torque", reference character α2 designates the "ring gear driven by the traveling motor", and reference character α3 represents the "accessory driving planetary gear carrier".

Figure 17:
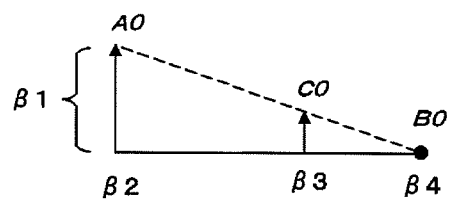
FIG. 17 is a drawing indicating the respective numbers of revolutions of the sun gear, the planetary gear carrier, and the ring gear when driven by an accessory driving motor.

In FIG. 17, in a case that the accessories are driven by the accessory driving motor 12, the sun gear 30 as the driving gear does not rotate (A0), the ring gear 26 stops rotation (B0), and the number of revolutions of the planetary gear carrier 32c becomes (C0).

In FIG. 17, reference character β1 represents that "the accessory is driven by the accessory motor in a case that the traveling motor is equal to or below N1", reference character β2 represents "the sun gear driven by the accessory motor", reference character β3 represents "the accessory driving planetary ring", and reference character β4 represents "the ring gear driven by the traveling motor".

Figure 18:
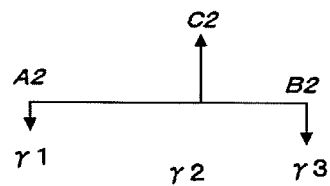
FIG. 18 is a drawing indicating a state of torque of each gear in FIG. 17.

FIG. 18 shows a state of torque of each gear in FIG. 17. In FIG. 18, reference character γ1 represents that negative drive torque (A2) is generated by the second braking device 18 on the accessory driving motor 12e side, reference character γ3 represents that the ring gear 26 on the traveling motor 8 side is braked with negative torque (B2), and the planetary gear carrier 32c that drives the accessory 11 generates positive torque (C2) in a case that such an operation is effected, as shown in γ2.

According to the fourth embodiment having the above-described construction, for example, steering without driving can be carried out even if a vehicle velocity is substantially zero and the engine 1 is stopped, and the air conditioner can be operated even if the vehicle and the engine are stopped.

Figure 19:
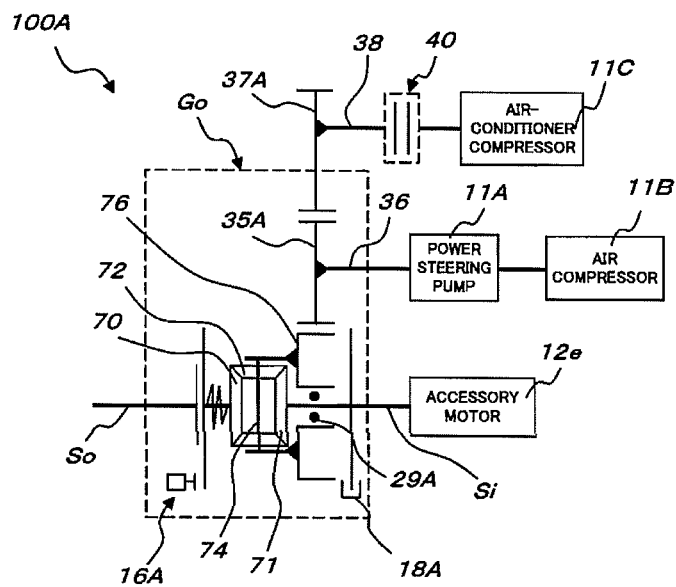
FIG. 19 is a block diagram showing a gearbox in a fifth embodiment.
Figure 20:
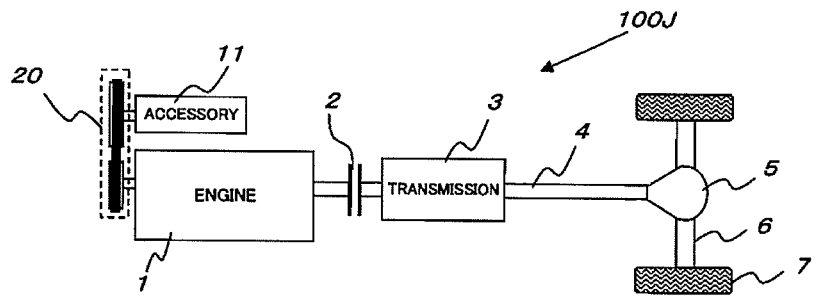
FIG. 20 is a block diagram showing a prior art.
Figure 21:
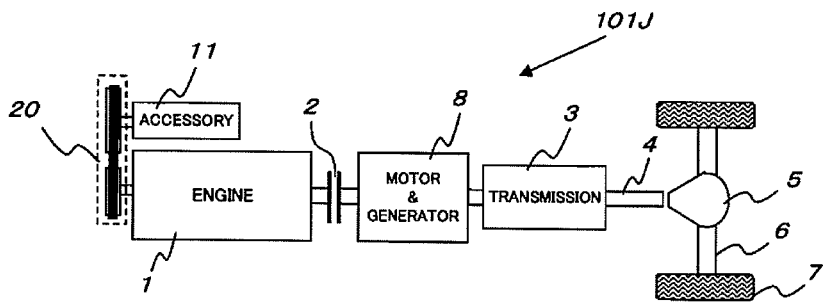
FIG. 21 is a block diagram showing a prior art different from a prior art shown in FIG. 20.
Figure 22:
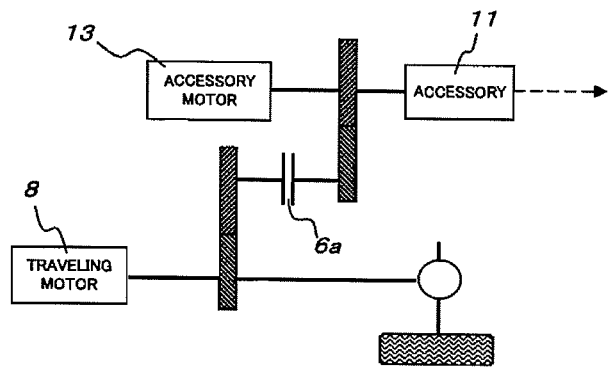
FIG. 22 is a block diagram showing a prior art different from those shown in FIGS. 20 and 21.
Figure 23:
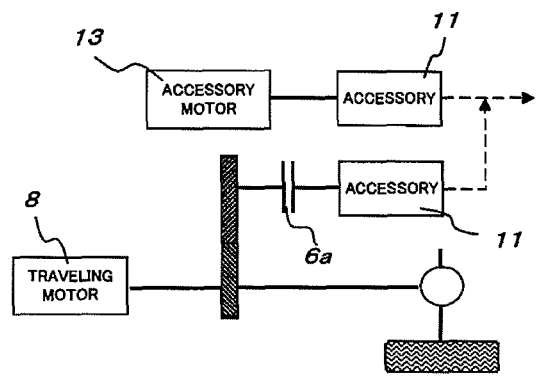
FIG. 23 is a block diagram showing another prior art.
Figure 24:
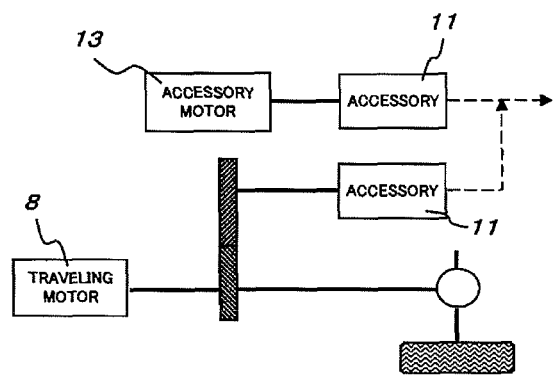
FIG. 24 is a block diagram showing yet another prior art.
Figure 25:
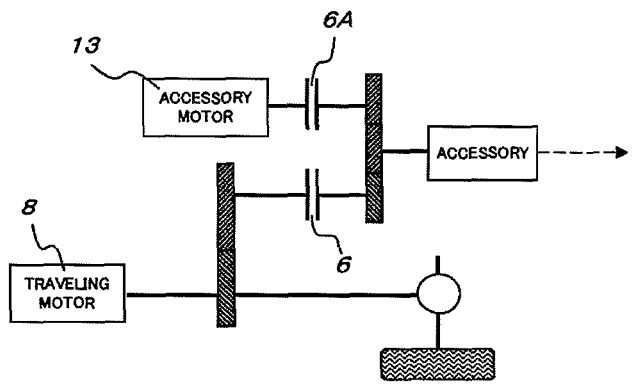
FIG. 25 is a block diagram showing still another prior art.

FIG. 19 shows a fifth embodiment according to the present invention.

In the fifth embodiment, a planetary gear mechanism used for a drive shaft of a vehicle is adopted as the gearbox Go in the fourth embodiment in FIG. 11, thereby reducing a size.

Since this type of planetary gear mechanism is used for drive shafts of a passenger car to a large-size truck, diverting device members of respective units results in large effect of cost reduction or maintenance.

In FIG. 19, parts different from FIG. 2 will be mainly explained hereinafter. It is to be noted that, in FIG. 19, like names and like reference numerals denote parts equal to those in FIG. 11.

In FIG. 19, drive power take-off mechanism 20 operates as an input device of an accessory drive mechanism according to the fifth embodiment, which is denoted by reference numeral 100A as a whole.

A clutch/brake mechanism 16A on a traveling motor 8 side is disposed to an output shaft So of the drive power take-off mechanism 20. Here, a construction or an operation of the clutch/brake mechanism 16A is the same as that of the clutch/brake mechanism 16 shown in FIG. 12.

On the output shaft So, a first pinion gear 70 as a bevel gear is disposed to a rear portion (a side part from the drive power take-off mechanism 20: the right side in FIG. 19) of the clutch/brake mechanism 16A.

A second pinion gear 71 as a bevel gear having the same diameter and the same number of teeth as the first pinion gear 70 is disposed on an output shaft 12 of an accessory driving motor 12e so as to face the first pinion gear 70. Here, the output shaft 12 is arranged on the same axis line as the output shaft So.

A plurality of third pinion gears 72 as small bevel gears engage between the first pinion gear 70 and the second pinion gear 71.

A rotating shaft 74 serving as the rotation center of the third pinion gears 72 is provided to pierce the plurality of third pinion gears 72, and the third pinion gears 72 are rotatably provided to the rotating shaft 74.

A ring gear 76 is disposed on the outer side of the rotating shaft 74 in a radial direction. Here, to clarify a gear train construction, in FIG. 19, the rotating shaft 74 and the ring gear 76 are represented as a construction that is offset in an axial line direction of the output shafts So and 12.

The rotation center of the ring gear 76 (placed on the inner side of the ring gear 76 in the radial direction) is rotatably disposed to the output shaft 12 through a bearing 29A.

On the output shaft 12, a braking device 18A as a brake on the accessory driving motor 12e is disposed between the bearing 29A and the accessory driving motor 12e.

A first gear 35A is externally engaged with external teeth of the ring gear 76. Moreover, a rotating shaft 36 of the first gear 35A is coupled with a power steering pump 11A and an air compressor 11B in a so-called "tandem state".

A second gear 37A is externally engaged with the first gear 35A. Additionally, a rotating shaft 38 of the second gear 37A is coupled with an air-conditioner compressor 11C.

Other constructions and effects of the fifth embodiment depicted in FIG. 19 are the same as those of the fourth embodiment.

REFERENCE SIGNS LIST

1 . . . engine
2 . . . clutch
3 . . . transmission
8 . . . traveling motor
10 . . . gearbox
11 . . . accessory
11A . . . power steering pump
11B . . . air compressor
11C . . . air-conditioner compressor
12 . . . accessory driving motor
12A . . . power steering/air compressor driving motor
12C . . . air-conditioner pressor driving motor
13 . . . accessory driving motor
16, 16A . . . clutch/brake mechanism (first braking device)
18, 18A . . . braking device (second braking device)
20 . . . drive power take-off mechanism
26 . . . ring gear
28 . . . planetary gear
30 . . . sun gear
32c . . . planetary gear carrier
35, 35A . . . first gear
36 . . . rotating shaft of the first gear
37, 37A . . . second gear
38 . . . rotating shaft of the second gear
40 . . . (electromagnetic) clutch
50 . . . controlling means/control unit
51 . . . ignition switch detecting means
52 . . . motor revolution detecting means/motor revolution detecting sensor
53 . . . air-conditioner ON/OFF switch
56 . . . accessory driving motor driving means/power steering/air compressor driving means
57 . . . accessory driving motor driving means/air-conditioner compressor driving means
60 . . . control device
70 . . . first pinion gear
72 . . . second pinion gear
74 . . . rod-like member
76 . . . ring gear
100 . . . accessory drive mechanism for a hybrid vehicle/accessory drive mechanism
541 . . . input means
500 . . . arithmetic means
556 . . . detecting means
M1 . . . first accessory system
M2 . . . second accessory system
So . . . output shaft of the drive power take-off mechanism

The invention claimed is:

1. An accessory drive mechanism for a hybrid vehicle, wherein a drive power take-off mechanism, which takes out a power from a traveling drive system including an engine and a traveling motor by means of a wrapping-type transmission mechanism, is provided, an accessory is connected to the drive power take-off mechanism via a gearbox, an output shaft of the drive power take-off mechanism and an output shaft of an accessory driving motor are connected to the gearbox, a first braking device is interposed in an output shaft of the drive power take-off mechanism, a second braking device is interposed in the output shaft of the accessory driving motor, a revolution measurement device which measures a number of revolutions of the traveling drive system and a control device are provided, a measurement result of the revolution measurement device is input to the control device, and the control device has functions of stopping the accessory driving motor, operating the second braking device and releasing the first braking device in a case that a number of revolutions transmitted from the traveling drive system is not lower than a predetermined number of revolutions and functions of driving the accessory driving motor, operating the first braking device and releasing the second braking device in a case that a number of revolutions transmitted from the traveling drive system is lower than the predetermined number of revolutions.

2. The accessory drive mechanism for a hybrid vehicle according to claim 1, wherein the output shaft of the drive power take-off mechanism and the output shaft of the accessory driving motor are coaxially arranged in the gearbox, the gearbox comprises: a ring gear including internal teeth therein and being provided at an output shaft end portion of the drive power take-off mechanism; a plurality of planetary gears including external teeth which engage with the internal teeth of the ring gear; a sun gear including external teeth which engage with the external teeth of the planetary gears; and a planetary gear carrier connecting to rotation centers of the planetary gears, the sun gear is provided at an output shaft end portion of the accessory driving motor, the planetary gear carrier includes a rotating shaft which is coaxial with the output shaft of the accessory driving motor and can rotate relatively to the output shaft of the accessory driving motor, external teeth are formed on an outer edge portion in a radial direction of the planetary gear carrier 32c, the accessory drive mechanism includes a first gear being externally engaged with the external teeth of the planetary gear carrier, and a rotating shaft of the first gear is connected to a pump for driving power steering and a compressor for supplying compressed air.

* * * * *